United States Patent
Sumi

(10) Patent No.: US 7,635,936 B2
(45) Date of Patent: Dec. 22, 2009

(54) FLUID DYNAMIC PRESSURE BEARING AND SPINDLE MOTOR

(75) Inventor: Shigeharu Sumi, Kyoto (JP)

(73) Assignee: Nidec Corporation, Kyoto (JP)

( * ) Notice: Subject to any disclaimer, the term of this patent is extended or adjusted under 35 U.S.C. 154(b) by 234 days.

(21) Appl. No.: 11/849,847

(22) Filed: Sep. 4, 2007

(65) Prior Publication Data

US 2008/0218019 A1    Sep. 11, 2008

Related U.S. Application Data

(63) Continuation-in-part of application No. 10/904,384, filed on Nov. 8, 2004, now Pat. No. 7,265,467.

(30) Foreign Application Priority Data

Nov. 7, 2003  (JP)  ............... 2003-378667

(51) Int. Cl.
     H02K 5/16    (2006.01)
(52) U.S. Cl. ........................................ 310/90
(58) Field of Classification Search ............ 310/90, 310/90.5; 384/112, 114
    See application file for complete search history.

(56) References Cited

U.S. PATENT DOCUMENTS

| | | | |
|---|---|---|---|
| 5,623,382 A | 4/1997 | Moritan et al. | |
| 5,715,116 A | 2/1998 | Moritan et al. | |
| 6,307,293 B1 * | 10/2001 | Ichiyama | 310/90.5 |
| 6,339,270 B1 * | 1/2002 | Ichiyama | 310/67 R |
| 6,828,709 B2 | 12/2004 | Grantz et al. | |
| 6,948,852 B2 | 9/2005 | Oelsch | |
| 7,059,773 B2 | 6/2006 | Hafen et al. | |
| 7,119,464 B2 | 10/2006 | Braun et al. | |
| 7,153,028 B2 | 12/2006 | Oelsch | |
| 7,241,050 B2 | 7/2007 | Uenosono et al. | |
| 7,265,467 B2 * | 9/2007 | Sumi | 310/90 |
| 2004/0091188 A1 | 5/2004 | Aiello et al. | |
| 2005/0074191 A1 | 4/2005 | Braun et al. | |
| 2005/0084189 A1 | 4/2005 | Oelsch | |
| 2005/0175265 A1 | 8/2005 | Kull et al. | |
| 2006/0029311 A1 | 2/2006 | Bausch | |
| 2006/0126979 A1 | 6/2006 | Uenosono et al. | |

(Continued)

FOREIGN PATENT DOCUMENTS

JP    11-55898 A    2/1999

(Continued)

OTHER PUBLICATIONS

Shigeharu Sumi; "Fluid Dynamic Pressure Bearing ANS Spindle Motor"; U.S. Appl. No. 10/904,384, filed Nov. 8, 2004.

*Primary Examiner*—Nguyen N Hanh
(74) *Attorney, Agent, or Firm*—Keating & Bennett, LLP

(57) ABSTRACT

A fluid dynamic bearing includes a shaft, a stationary portion supporting the shaft in a rotatable manner, a lubricating oil arranged in a radial gap defined between an outer circumferential surface of the shaft and a surface of the stationary portion, opposing each other. The fluid dynamic bearing includes a first seal portion arranged radially outside of the radial gap, and a second seal portion arranged at an axially upper end of the radial gap. The axial length of the first seal portion is greater than that of the second seal portion.

22 Claims, 24 Drawing Sheets

U.S. PATENT DOCUMENTS

| | | |
|---|---|---|
| 2006/0274448 A1 | 12/2006 | Asada et al. |
| 2006/0284504 A1* | 12/2006 | Aiello et al. .................. 310/90 |
| 2007/0092172 A1 | 4/2007 | Obara et al. |

FOREIGN PATENT DOCUMENTS

| | | |
|---|---|---|
| JP | 2003-139131 A | 5/2003 |
| JP | 3453046 B2 | 10/2003 |
| JP | 2005-155912 A | 6/2005 |
| JP | 2006-250193 A | 9/2006 |
| JP | 3828437 B2 | 10/2006 |
| JP | 2007-113705 A | 5/2007 |
| JP | 2007-209193 A | 8/2007 |

* cited by examiner

FLUID DYNAMIC PRESSURE BEARING AND SPINDLE MOTOR

CROSS REFERENCE TO RELATED APPLICATIONS

This application is a Continuation-in-Part application of U.S. patent application Ser. No. 10/904,384, filed on Nov. 8, 2004, currently pending.

BACKGROUND OF THE INVENTION

1. Field of the Invention

The present invention relates to a fan for sending air in which a rotor of a motor is arranged in an impeller cup.

2. Description of the Related Art

Bearing devices using fluid dynamic pressure (hereinafter referred to as a dynamic pressure bearing) are conventionally used for a spindle motor of a signal recording and reproducing device such as a hard disk drive.

These days, the signal recording and reproducing devices such as hard disk drives are installed in portable devices such as portable music players, and there is a great demand for a signal recording and reproducing device which has more storage capacity, and reduced thickness and dimensions. In order to reduce the thickness and the dimensions of the signal recording and reproducing device, it is desirable to reduce the thickness and dimensions of the spindle motor.

By reducing the thickness of the spindle motor, however, an axial height of the dynamic pressure bearing is reduced as well, thereby reducing resistance of the dynamic pressure bearing against an external force.

SUMMARY OF THE INVENTION

In order to overcome the problems above, preferred embodiments of the present invention provide a fluid dynamic pressure bearing including a shaft centered on a center axis, a stationary portion having a bearing hole into which the shaft is inserted and arranged to support the shaft in a rotatable manner about the center axis, a radial gap located between opposing surfaces of the shaft and the stationary portion, a lubricating oil with which the radial gap is filled, a first seal portion at least partially in the form of an axially extending space and arranged within the stationary portion outside the radial gap in a radial direction that is substantially perpendicular to the center axis and connected to the radial gap, a second seal portion at least partially in the form of an axially extending space and arranged at an upper end of the radial gap and connected to the radial gap and the first seal portion, and a radial fluid dynamic pressure bearing located in a first gap as a portion of the radial gap and having a plurality of dynamic pressure generation grooves arranged to generate a dynamic pressure of the lubricating oil during rotation of the shaft. In the fluid dynamic pressure bearing, an axial length of the first seal portion is longer than that of the second seal portion.

Another preferred embodiment of the present invention provides a fluid dynamic pressure bearing including a shaft centered on a center axis, a stationary portion having a bearing hole into which the shaft is inserted and arranged to support the shaft in a rotatable manner about the center axis, a radial gap located between opposing surfaces of the shaft and the stationary portion, a lubricating oil with which the radial gap is filled, a first seal portion at least partially in the form of an axially extending space and arranged within the stationary portion outside the radial gap in a radial direction that is substantially perpendicular to the center axis and connected to the radial gap, a second seal portion at least partially in the form of an axially extending space and arranged at an upper end of the radial gap and connected to the radial gap and the first seal portion, and a radial fluid dynamic pressure bearing located in a first gap as a portion of the radial gap and having a plurality of dynamic pressure generation grooves arranged to generate a dynamic pressure of the lubricating oil during rotation of the shaft. In the fluid dynamic pressure bearing, a first boundary between the lubricating oil and air is located in the first seal portion, and a second boundary between the lubricating oil and air is located in the second seal portion axially above the first boundary.

Yet another preferred embodiment of the present invention provides a fluid dynamic pressure bearing including a shaft centered on a center axis, a stationary portion having a bearing hole into which the shaft is inserted and arranged to support the shaft in a rotatable manner about the center axis, a radial gap located between an outer surface of the shaft and an inner surface of the stationary portion, and a lubricating oil with which the radial gap is filled. In the fluid dynamic pressure bearing, the stationary portion includes a generally cylindrical sleeve having the bearing hole, a housing surrounding the sleeve, and a cover member having a plate-like portion located above the sleeve and a wall portion extending downward from an outer periphery of the plate-like portion. The plate-like portion has an inner surface opposed to the outer surface of the shaft. A first seal portion, at least partially in the form of an axially extending space, is located between the wall portion of the cover member and a portion of the stationary portion opposed thereto to be connected to the radial gap. A second seal portion, at least partially in the form of an axially extending space, is located at an upper end of the radial gap between the inner surface of the plate-like portion and the outer surface of the shaft to be connected to the radial gap and the first seal portion. A radial fluid dynamic pressure bearing formed in a first gap as a portion of the radial gap and having a plurality of dynamic pressure generation grooves arranged to generate a dynamic pressure of the lubricating oil during rotation of the shaft.

Further, another preferred embodiment of the present invention provides a fluid dynamic pressure bearing including a shaft centered on a center axis, a stationary portion having a bearing hole into which the shaft is inserted and arranged to support the shaft in a rotatable manner about the center axis, a radial gap located between an outer surface of the shaft and an inner surface of the stationary portion opposed thereto, and a lubricating oil with which the radial gap is filled. In the fluid dynamic pressure bearing, a first seal portion, at least partially in the form of a circumferentially extending space, is arranged outside the radial gap in a radial direction that is substantially perpendicular to the center axis and connected to the radial gap. In addition, a second seal portion, at least partially in the form of an axially extending space, is arranged at an upper end of the radial gap and connected to the radial gap and the first seal portion. A radial fluid dynamic pressure bearing is located in a first gap as a portion of the radial gap and has a plurality of dynamic pressure generation grooves arranged to generate a dynamic pressure of the lubricating oil during rotation of the shaft.

Other features, elements, steps, processes, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1A:
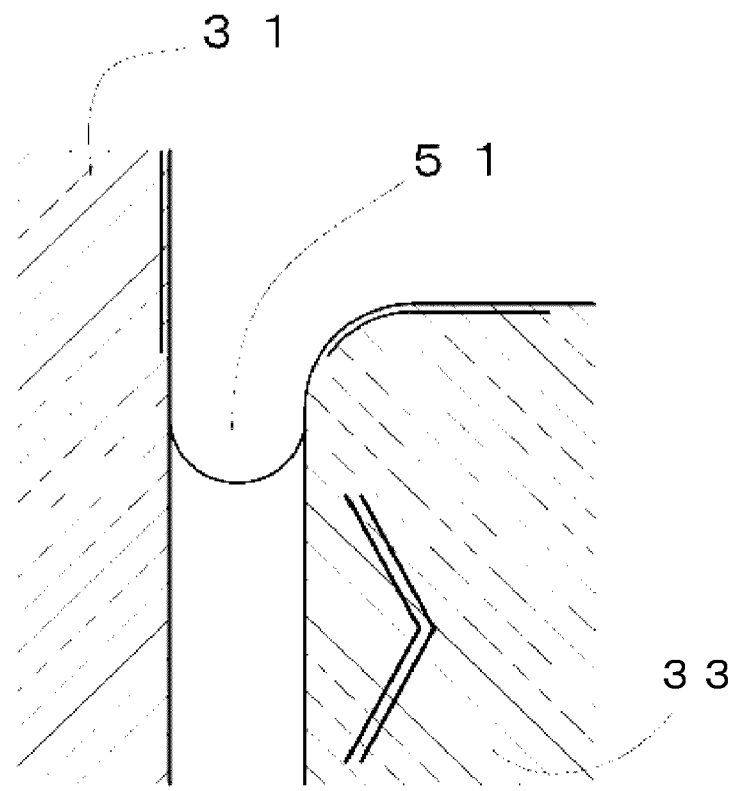
FIG. 1A is a cross-sectional view illustrating a second boundary and radial dynamic pressure grooves of the bearing device.

With reference to FIGS. 1A through 18, a bearing device and a spindle motor according to the preferred embodiments of the present invention will be described in detail.

In the description of the preferred embodiments of the present invention, words such as upper, lower, left, right, upward, downward, top, and bottom for describing positional relationships between respective members and directions merely indicate positional relationships and directions in the drawings. Such words do not indicate positional relationships and directions of the members mounted in an actual device. Additionally, in the following description, an axial direction indicates a longitudinal direction of a rotation axis, and a radial direction indicates a direction that is perpendicular or substantially perpendicular to the center axis. A radially outward direction indicates a direction departing from the center axis along the radial direction, and a radially inside direction indicates a direction approaching to the center axis along the radial direction.

First Preferred Embodiment 1-1 Description of Spindle Motor

Figure 2:
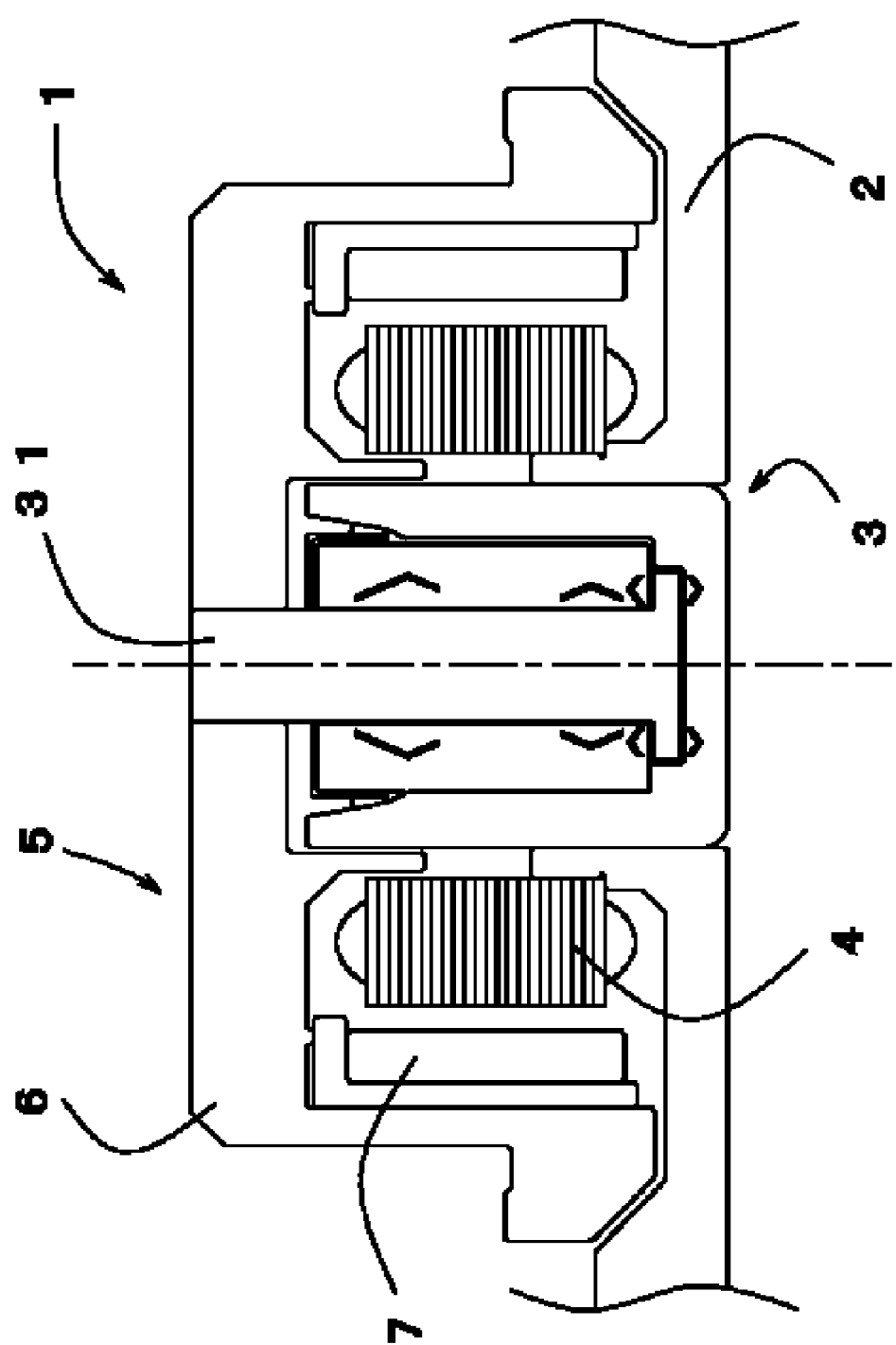
FIG. 2 is a cross-sectional view illustrating a spindle motor according to a first preferred embodiment of the present invention.

FIG. 2 is a cross-sectional view of a spindle motor 1 according to a first preferred embodiment of the present invention. The spindle motor 1 preferably includes a base plate 2, a bearing device 3 attached to the base plate 2, a stator 4 arranged on the base plate 2 so as to radially surround the bearing device 3, and a rotor 5 attached to one end of a shaft 31. The rotor 5 includes a hub 6 and a rotor magnet 7, and the rotor magnet 7 is attached to an inner circumferential surface of a cylindrical portion of the hub 6 so as to oppose a magnetic pole of the stator 4. By energizing the stator 4, a rotary drive force is generated. The base plate 2 of the spindle motor 1 is attached to a case of a hard disk drive or the like.

1-2 Entire Structure of Bearing Device

Figure 3A:
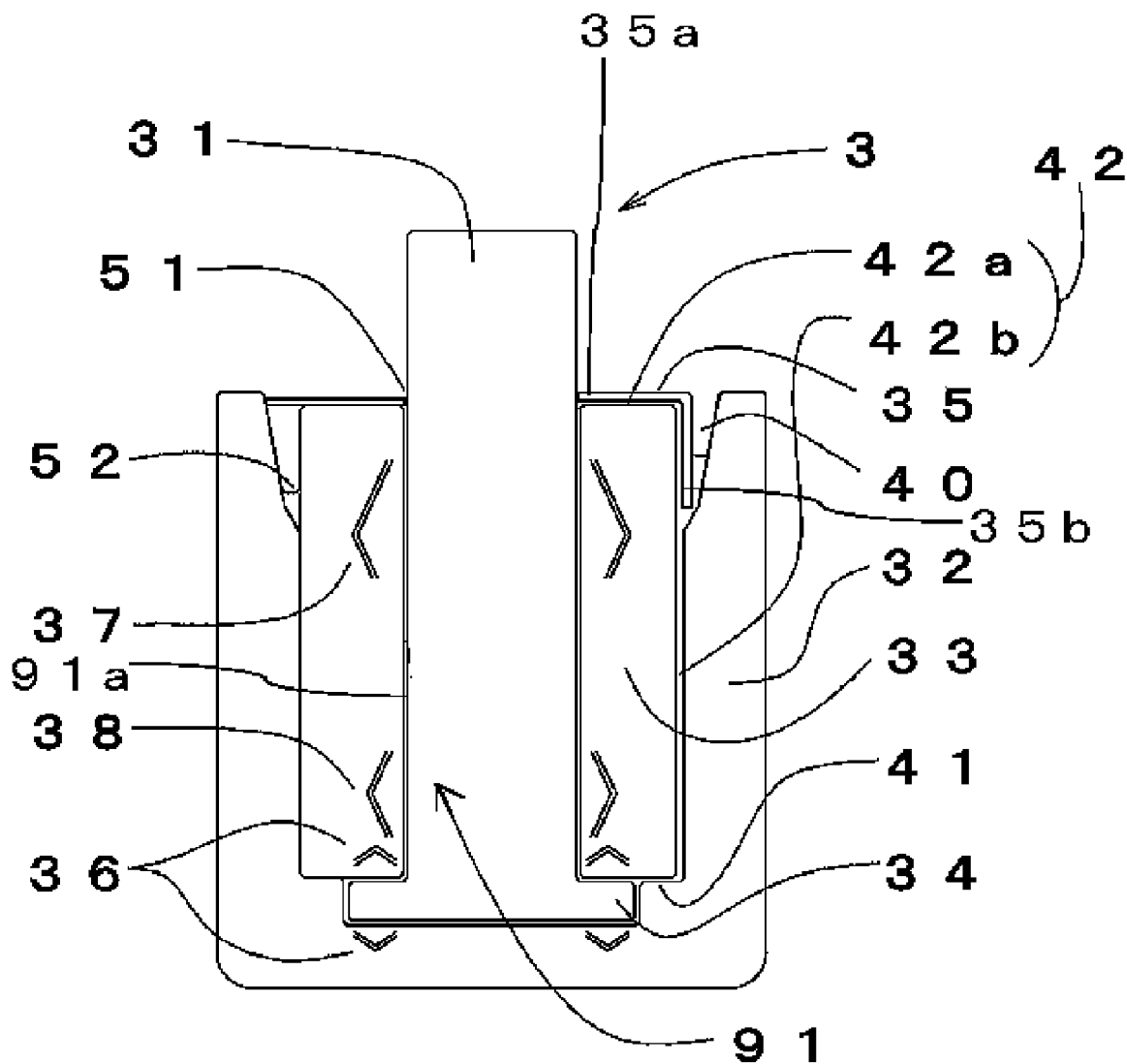
FIG. 3A is a cross-sectional view illustrating a bearing device according to the first preferred embodiment of the present invention.
Figure 3B:
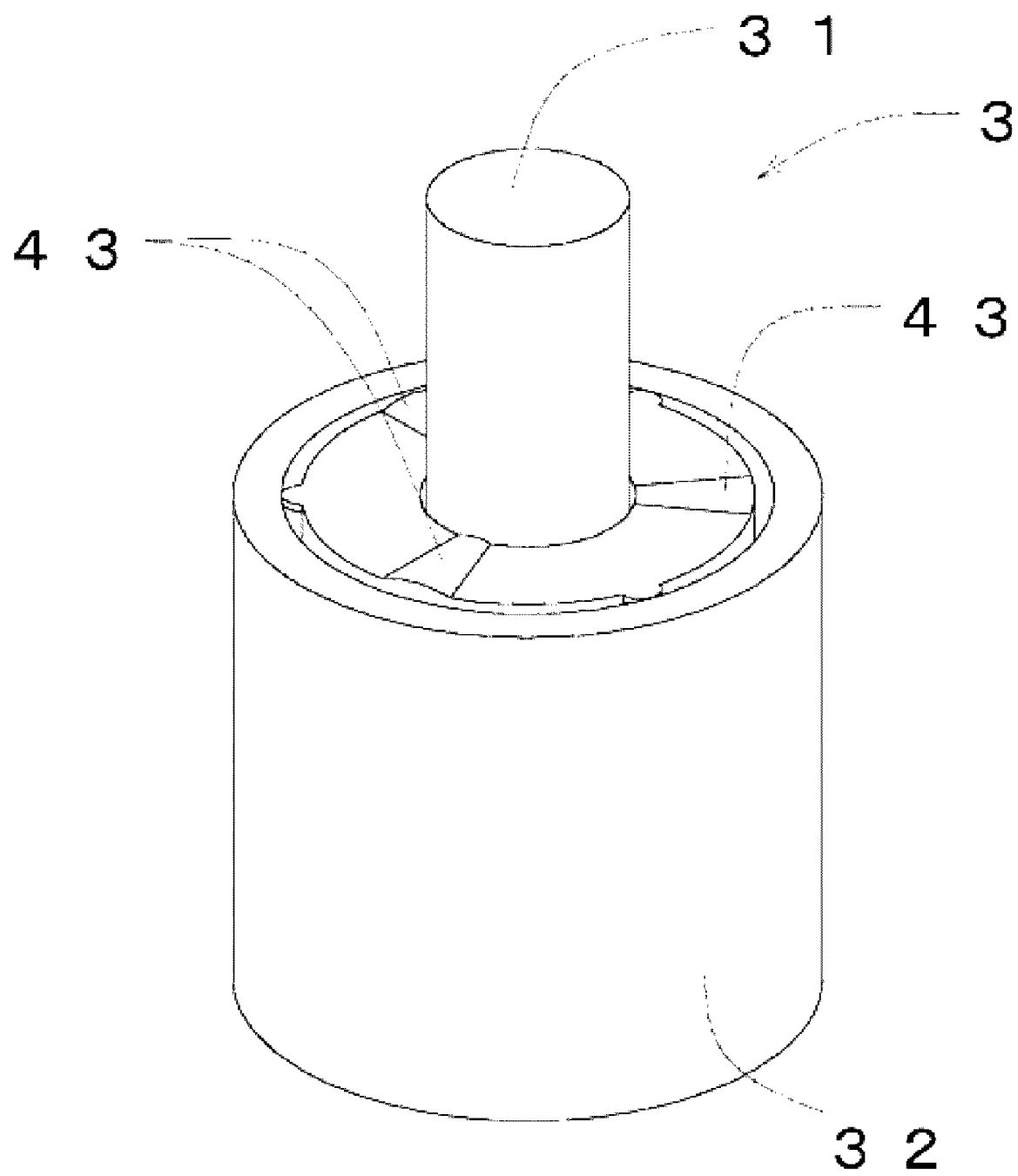
FIG. 3B is a perspective view illustrating the bearing device according to the first preferred embodiment of the present invention.

FIG. 3A is a cross-sectional view of the bearing device 3 and FIG. 3B is a perspective view thereof.

The bearing device 3 includes a stationary portion having a substantially cylindrical sleeve 33 defining a bearing hole radially inside thereof and a cylindrical housing 32 with a base, and a rotational portion having a shaft 31 disposed radially inside of the sleeve 33 (i.e., the shaft 31 is inserted into the bearing hole).

As illustrated in FIG. 3A, a thrust plate 34 is arranged at an axially lower end portion of the shaft 31 such that an axially upper surface of the thrust plate 34 axially opposes a lower end surface of the sleeve 33. In the present preferred embodiment of the present invention illustrated in FIG. 3A, a step 41 is arranged at a lower portion of an inner circumferential surface of the housing 32 such that the thrust plate 34 is housed at an inside bottom of the housing 32. It should be noted that the step 41 may be omitted from the housing 32 when an outer diameter of the thrust plate 34 and an outer diameter of the sleeve 33 are approximately the same.

1-3 Lubricating Oil and Communicating Path

A first gap 91a which is a portion of a radial gap 91 is defined between an outer circumferential surface of the shaft 31 and a stationary portion (an inner circumferential surface of the sleeve 33 in the present preferred embodiment of the present invention). Similarly, gaps are provided between the thrust plate 34, and the inner circumferential surface of the housing 32, and between the lower end surface of the sleeve 33 and the axially upper surface of the thrust plate 34. These gaps are filled with a lubricating fluid (i.e., lubricating oil) without interruption. In addition, an upper portion of the radial gap 91 and a lower portion of the radial gap 91 are communicated by a path 42, described below.

A cover member 35 is fitted to an upper end side of the sleeve 33. The cover member 35 includes a plate-like portion 35a and a wall portion 35b axially downwardly extending from a radially outer end of the plate-like portion 35a. A radially inner surface of the plate-like portion 35a radially opposes the outer circumferential surface of the shaft 31. Between an outer circumferential surface of the wall portion 35b and the inner circumferential surface of the housing 32 opposing each other via an axially extending space, a first seal portion 40 in which a clearance therebetween is enlarged toward an opening end. In other words, the first seal portion 40 is arranged within the stationary portion outside the radial gap 91 in a radial direction that is perpendicular or substantially perpendicular to the center axis. Furthermore, the cover member 35 includes convex portions 43 (FIG. 3B) at which a portion of the plate-like portion 35a is axially upwardly raised, formed by pressing, for example. Each of the convex portions 43 extends in a radial direction. When the cover member is attached to the bearing device, a clearance between the upper end surface of the sleeve 33 and the plate-like portion 35a in the axial direction gradually increases toward a radially outer direction at a location axially below each of the convex portions 43, defining first paths 42a in which the lubricating oil may pass through. At least one of the upper end surface of the sleeve 33 and an axially lower surface of the plate-like member 35a may have a tapered surface slanted toward each other. The first paths 42a are a part of the path 42, connecting the upper portion and the lower portion of the radial gap 91.

Figure 4:
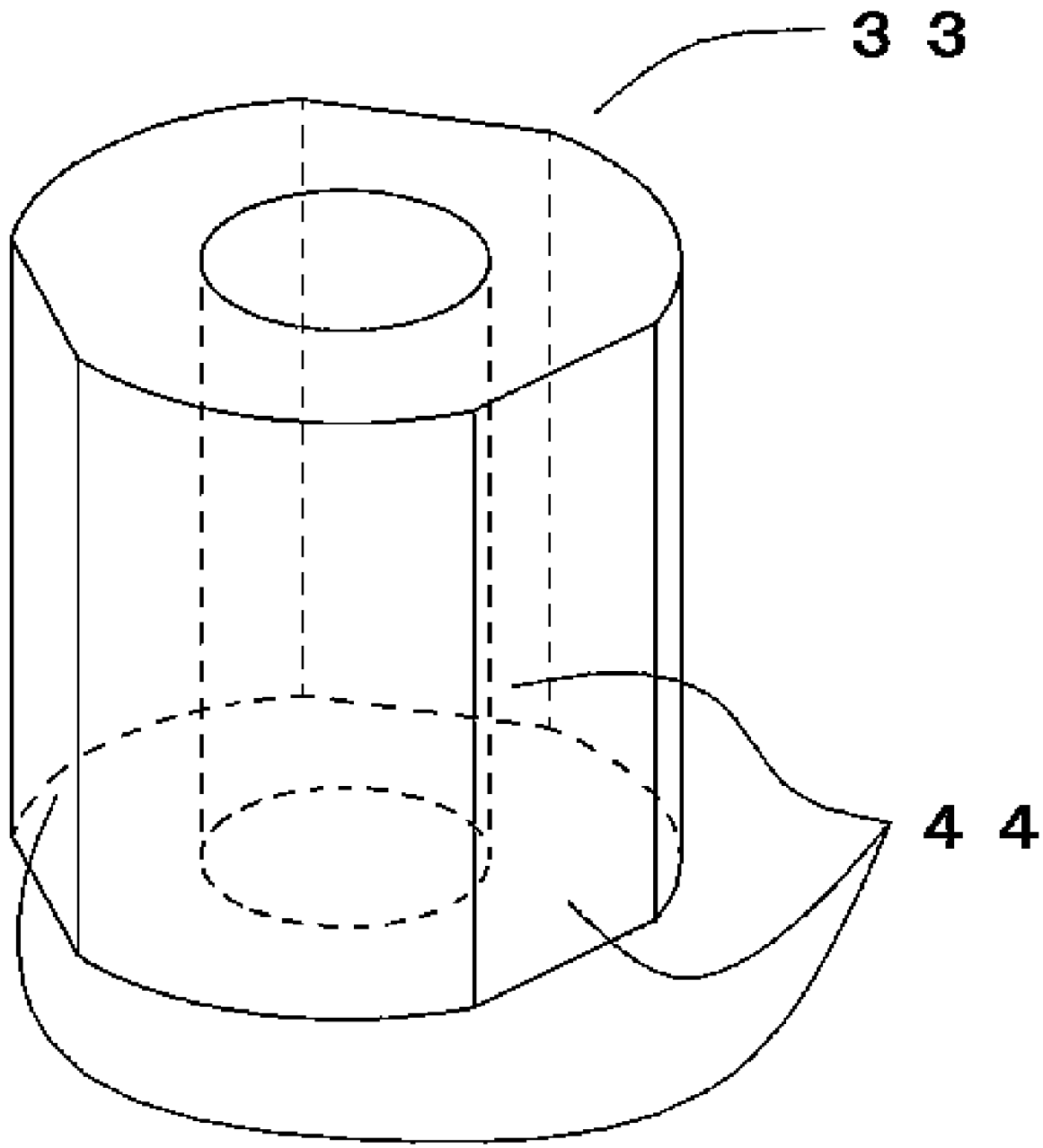
FIG. 4 is a perspective view illustrating a sleeve of the bearing device according to the first preferred embodiment of the present invention.

On a radially outside surface of the sleeve 33, three substantially planar areas 44 extending in an axial direction and are preferably arranged in a circumferentially spaced manner (see FIG. 4). By fitting the sleeve 33 into the housing 32, second paths 42b are defined with clearances between the radially outside surface of the sleeve 33 and the inner circumferential surface of the housing 32.

Figure 5A:
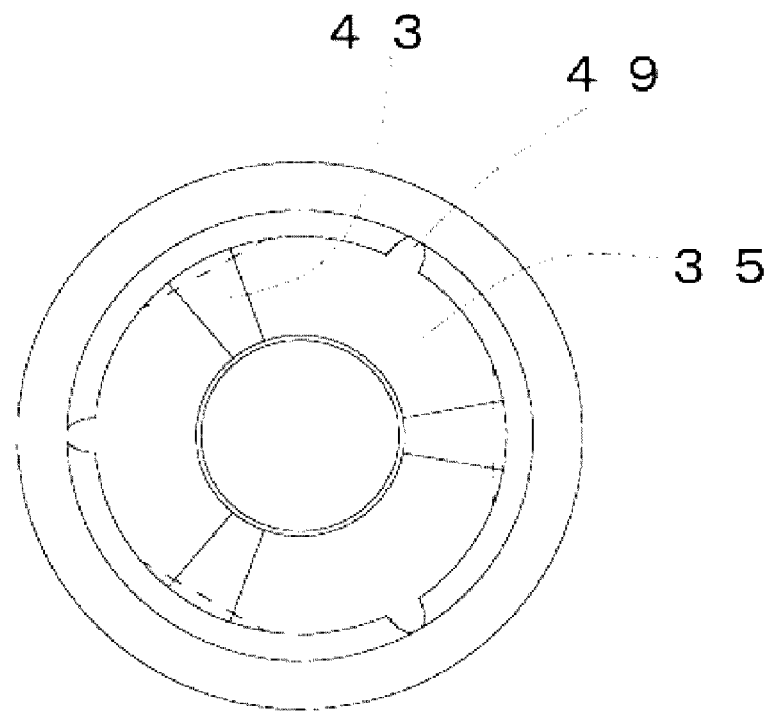
FIG. 5A is a top plan view illustrating the bearing device according to the first preferred embodiment of the present invention.
Figure 5B:
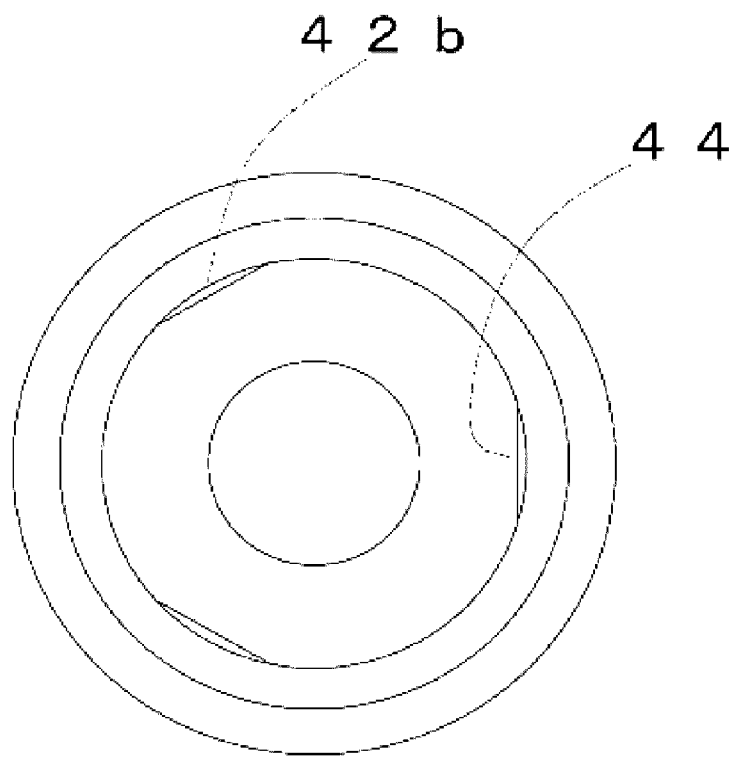
FIG. 5B is a top plan view illustrating the bearing device according to the first preferred embodiment of the present invention without a cover member illustrated in FIG. 5A.

FIG. 5A is a top plan view illustrating the bearing device 3 viewed from an axially upper side thereof. FIG. 5B is a top plan view illustrating the bearing device from which the cover member 35 is removed. Dashed lines in FIG. 5A indicate the locations of the planar areas 44 of the sleeve 33. Radially outer ends of the convex portions 43 are respectively arranged axially above the corresponding planar areas 44. With this configuration, each of the first paths 42a and the second paths 42b are connected, defining together the path 42 that is arranged to continuously connect the axially upper portion and the axially lower portion of the bearing device. In the bearing device, the path 42 and the radial gap 91 are filled with the lubricating oil. With this configuration, the lubricating oil smoothly circulates between the upper and lower portions of the radial gap.

As illustrated in FIG. 3A, when the step 41 arranged at the inner bottom portion of the housing 32 is abutted against the lower end surface of the sleeve 33, the second paths 42b may be closed at the step 41, thus failing to connect the path 42 with the radial gap 91. In the present preferred embodiment of the present invention, a concave portion is arranged in an upper surface of the step 41 to connect the second paths 42b and the radial gap 91 at a lower end of the second paths 42b, such that the lubricating oil smoothly circulates inside the bearing device.

The plate-like portion 35a includes a hole 46 (FIG. 6A) in which the shaft 31 is inserted. When the shaft 31 is inserted therein, the inner circumferential surface of the plate-like portion 35a radially opposes the outer circumferential surface of the shaft 31 via a minute gap (i.e., an axially extending space) therebetween, defining a second seal portion. In the second seal portion, a second boundary 51 between the lubricating oil and air is arranged. An oil repellent agent preferably composed of a fluorocarbon resin may be applied to the outer circumferential surface of the shaft 31 and the surface of the cover member 35 which are adjacent to the second boundary 51 to form an oil repellent region.

Figure 1B:
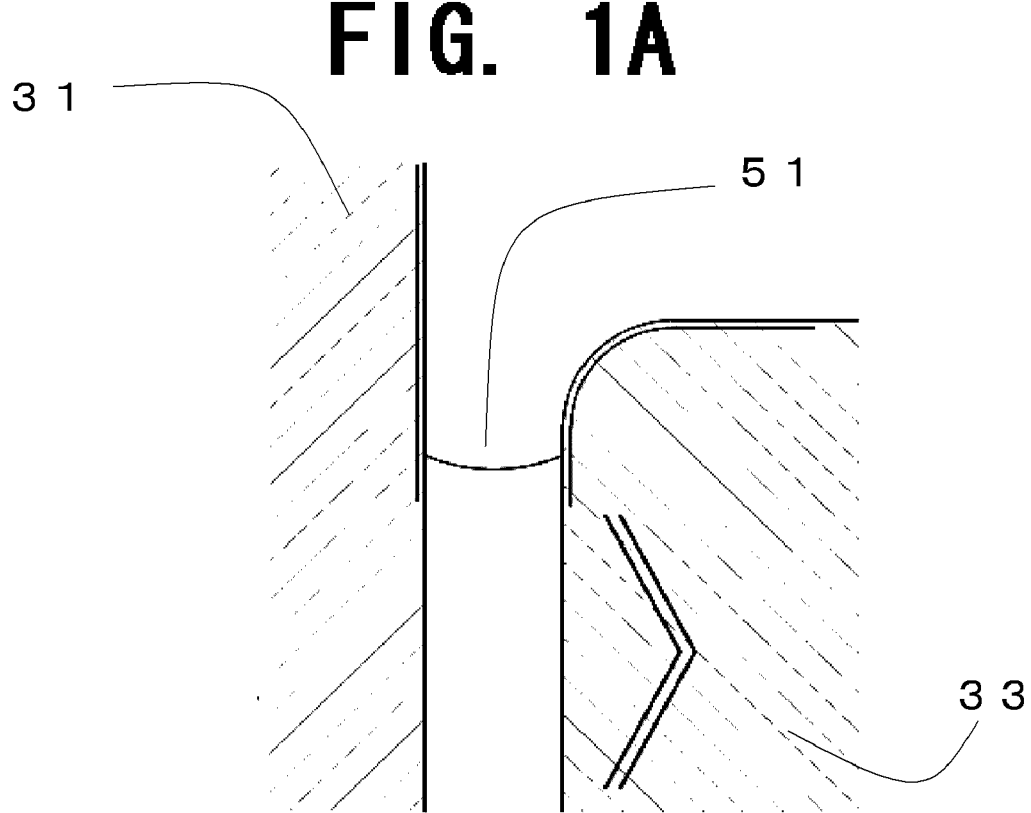
FIG. 1B is a cross-sectional view illustrating a second boundary and radial dynamic pressure grooves of the bearing device.

As illustrated in FIGS. 1A and 1B, exemplary cross-sectional views of a portion of the bearing device near the second boundary, the oil-repelling region is formed (illustrated by double lines on the shaft 31 and the sleeve 33) in the vicinity of the second boundary 51. When the oil-repellant region extends into the clearance, as shown in FIG. 1B, the contact angle of the lubricating oil on the surface defining the second seal portion becomes greater, making the second boundary 51 unstable. By arranging the oil repellent region as illustrated in FIG. 1A, the contact angle of the lubricating oil becomes smaller, making the second boundary 51 stable. In preferred embodiments of the present invention, the contact angle is referred to as the equilibrium angle of contact of a liquid on a rigid surface, measured within the liquid at the contact line where three phases (liquid, solid, gas) meet.

Meanwhile, the first seal portion 40 is connected to the first paths 42a in a lower end side of the plate-like portion 35a of the cover member 35. Up to the middle in the axial length of the first seal portion 40 is filled with the lubricating oil and thus the first boundary 52 is formed in the first seal portion 51. In addition, as illustrated in drawings, an axial length of the first seal portion 40 is greater than that of the second seal portion.

In the bearing device 3 according to present preferred embodiment of the present invention, the lubricating oil filling the gaps between the outer circumferential surface of the shaft 31 and the inner circumferential surface of the sleeve 33 comes in contact with ambient air only at these first and second boundaries. The second boundary may be located axially above the first boundary. In order to customize this feature, radial widths of the first seal portion 40 and the second seal portion may be preferably modified.

1-4 Dynamic Pressure Bearing

As illustrated in FIG. 3A, in the inner circumferential surface of the sleeve 33, a plurality of dynamic pressure generating grooves 37, 38 are arrayed at two positions axially separated from each other, defining upper and lower radial dynamic pressure bearing mechanisms, respectively. Each of these dynamic pressure generating grooves preferably includes two portions. One of the two portions acts so as to increase a downward pressure in the lubricating oil, and the other acts so as to increase an upward pressure in the lubricating oil, during the rotation of the shaft 31. The former portion is arranged at upper side of the latter, and thus high dynamic pressure is generated between them (e.g., at an axially middle portion between the two portions). With the high dynamic pressure, the shaft 31 is stably supported.

In the drawings, a double line drawn obliquely with respect to the axial direction indicates the existence of the dynamic pressure generating groove, and indicates that the pressure of the lubricating oil is increased toward the side on which the double line is spaced away from the bearing surface. The double line in the figure is cornered, and is farthest from the bearing surface at the corner, which indicates that at this portion, the highest pressure is generated.

Out of the two sets of radial dynamic pressure generating grooves 37 and 38, groove 37 located on the upper side is not vertically symmetrical, but the portion increasing the pressure downward is preferably larger. Therefore, the dynamic pressure generating grooves 37 act so as to push the lubricating oil downward of the bearing, while it generates a shaft supporting force in the radial direction. The other set of radial dynamic pressure generating grooves 38 is symmetrical and two sets of thrust dynamic pressure generating grooves 36 are arranged to be symmetrical in the radial direction.

In the entire dynamic pressure generating grooves, the radial dynamic pressure generating grooves 37 generate a flow of lubricating oil, in which the lubricating oil flows downward through the radial gap and flows through the communicating path 42 back to a vicinity of the second boundary 51 which is the upper end portion of the radial bearing surface. This flow inhibits leakage of the lubricating oil from the second boundary 51. Furthermore, it helps air bubbles or the like generated inside of the bearing to be discharged to the outside of the bearing via the communicating path 42 and the first seal portion 40.

1-5 Manufacturing Method

Next, the cover member 35 will be described with reference to FIGS. 6A, 6B, 6C and 7.

Figure 6A:
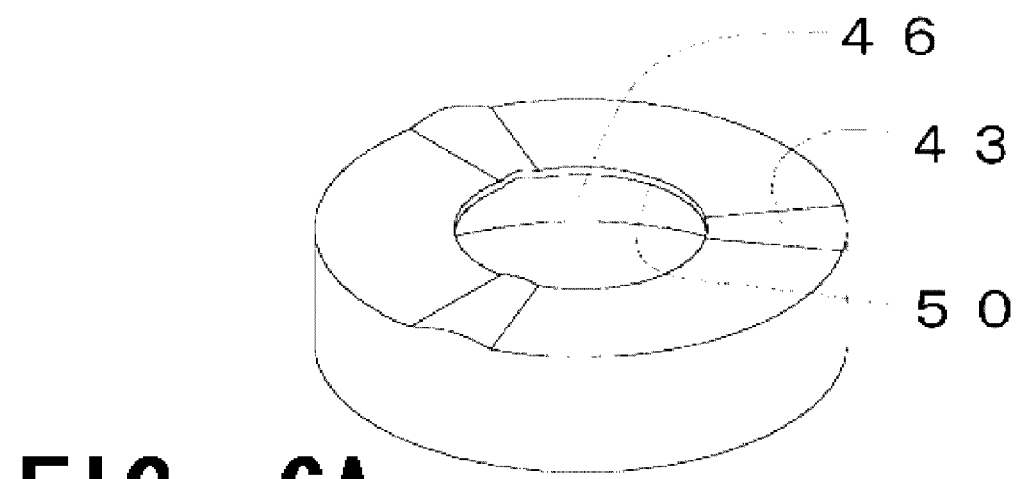
FIG. 6A is a perspective view illustrating a work in process at a step of manufacturing the cover member.
Figure 6B:
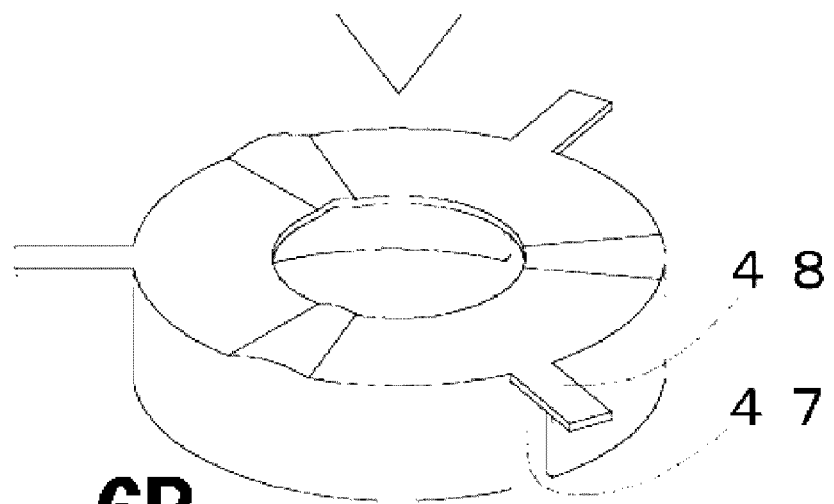
FIG. 6B is a perspective view illustrating a work in process at another step of manufacturing the cover member.
Figure 6C:
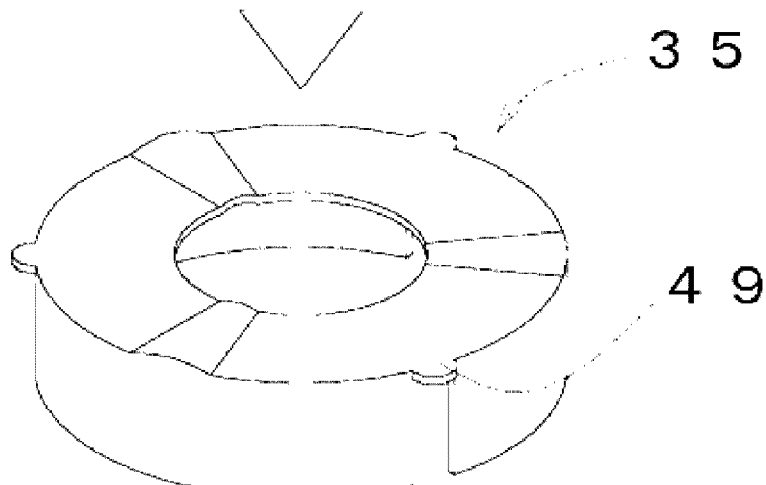
FIG. 6C is a perspective view illustrating a work in process at yet another step of manufacturing the cover member.

FIGS. 6A to 6C illustrate the cover member 35 in the manufacturing process thereof. Firstly, a metal plate or a thermoplastic plate is pressed to form the plate into an approximately cylindrical shape with a lid, and a portion of the lid is punched out to form the hole 46. During the pressing, the convex portions 43 extending in the radial direction are formed on the lid (see FIG. 6A).

Then, a radially side surface of the cover member 35 is cut and lifted at three lifted positions 48 preferably in a circumferentially equally spaced manner. In the present preferred embodiment of the present invention, the three convex portions 43 preferably are circumferentially equally spaced, and the lifted portions 48 at which the radially side surface is cut and lifted are arranged circumferentially between the adjacent convex portions 43. In other words, the lifted portions 48 and the convex portions 43 are alternately arranged at every 60 degrees, approximately. By lifting the lifted portions 48, slits 47 (i.e., circumferential spaces) are formed in a circumferentially substantially equally spaced manner in the radially side surface of the cover member 35 (see FIG. 6B).

The lifted portion 48 is then cut and connecting portions 49 are formed. Each of the connecting portions 49 radially protrudes so as to come in contact with the axially upper surface of the housing 32 when the cover member 35 is installed in the bearing device (see FIG. 6C).

After the processing of the cover member 35, the oil repellent agent is applied to an axially upper surface of the lid of the cover member 35 at an area around the hole 46 (i.e., on the plate-like portion 35a at an area around the hole 46) to provide an oil repellent property. It should be noted that the oil repellent agent is not applied to the inner circumferential surface defining the hole 46 and an axially lower surface of the plate-like portion 35a.

The cover member 35 is arranged on the sleeve such that the connecting portions 49 come in contact with the housing 32, and the connecting portions 49 are welded to fix the cover member 35 to the housing 32. The connecting portion 49 may be welded by radiating converged energy beam thereto (e.g., laser welding and electron beam welding may be applicable). Alternatively, the connecting portion 49 may be fixed to the housing 32 by adhesion or fitting.

For injection of the lubricating oil into the bearing device, the lubricating oil may be dropped into the first seal portion after the cover member 35 is welded to the housing 32. Alternatively, the cover member 35 may be welded after dropping the lubricating oil (see FIG. 7).

The bearing device according to the present preferred embodiment of the present invention preferably includes two air-lubricating oil boundaries in the first and second seal portions. Through this configuration, the lubricating oil smoothly fills the gaps provided in the bearing device since air in the gaps is released via either one of first or second seal portions when the lubricating oil is injected via the other seal portion.

Figure 7:
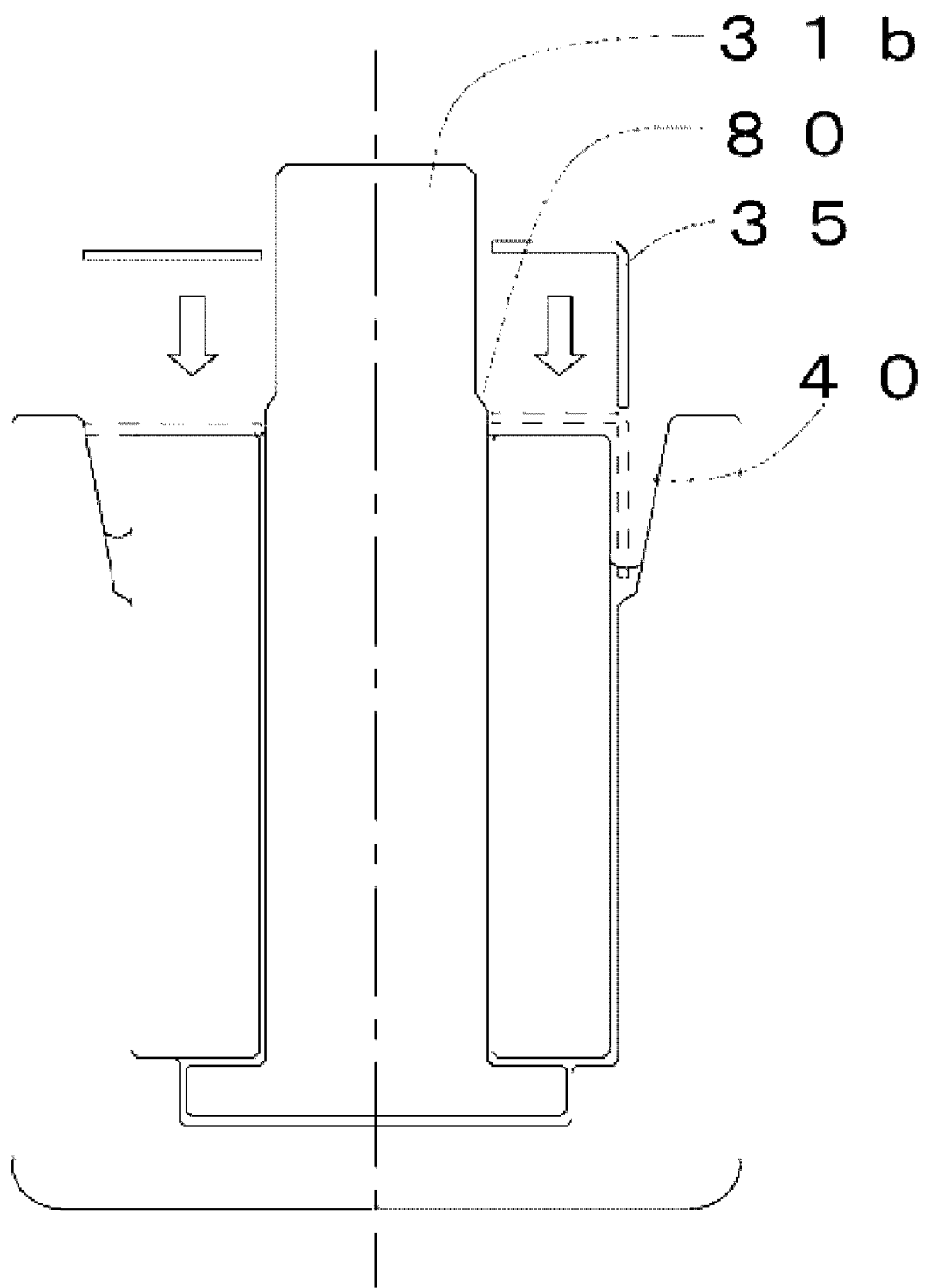
FIG. 7 is a cross sectional view illustrating a work in process at a step of manufacturing the bearing device according to the first preferred embodiment of the present invention.

In a shaft 31*b* of the bearing device illustrated in FIG. 7, an axially upper portion axially upwardly projecting from the hole 46 of the cover member 35 is slightly reduced in its diameter beginning at portion 80. Through this configuration, when attaching the cover member, the outer circumferential surface of the shaft 31*b* and the inner circumferential surface 50 of the hole 46 do not easily come into contact with each other. The diameter of the shaft is smaller than that of the hole even if the diameter is not reduced at the axially upper portion of the shaft 31*b*. It should be noted, however, with a small difference in the diameters of the shaft 31*b* and the hole 46, the inner circumferential surface 50 of the cover member 35 may be damaged during the attachment process of the cover member 35. This problem can be avoided by partially reducing the diameter of the shaft. The reduced diameter portion of the shaft 31*b* may not be necessarily continued across the region from an axially upper end of the shaft 31*b* to a vicinity of the opening of the hole 46. Even when it ends at a position located slightly axially upwardly away from the opening, the effect of preventing the contact between them may be attained. However, it is preferable that the diameter reduced portion of the shaft 31*b* extends to vicinity of the opening as illustrated in FIG. 7. Through this configuration, the lubricating oil leakage is reduced even in case the oil-repellent layer in the vicinity of the opening is somehow removed. With the diameter reduced portion axially extending vicinity of the opening, the clearance between the shaft 31*b* and the cover member 35 becomes greater, and thus the second boundary becomes large, restricting the outflow of the lubricating oil.

1-6 Material

Any preferable material (e.g., metal material) may be used for constructing the bearing device according to the present preferred embodiment of the present invention.

In the present preferred embodiment of the present invention, the housing is preferably made of aluminum alloy. The sleeve is preferably made of free-machining stainless steel, and after machining, any intervening substances may be removed by surface chemical treatment. Furthermore, the shaft is preferably made of martensitic stainless steel, and the cover member is preferably made of copper alloy or synthetic resin material such as liquid crystal polymer. Treatment for increasing attractiveness may be applied to the inner circumferential surface 50 defining the hole 46 of the cover member 35 as needed.

For the oil-repellent layer arranged on the cover member 35 at an area around the hole 46, perfluoro resin may preferably be used. Furthermore, for the lubricating oil, an ester based compound may preferably be used as a base oil. It should be noted, however, the materials are not limited to those described above, and various modifications may be made.

Variation of the First Preferred Embodiment

Figure 8A:
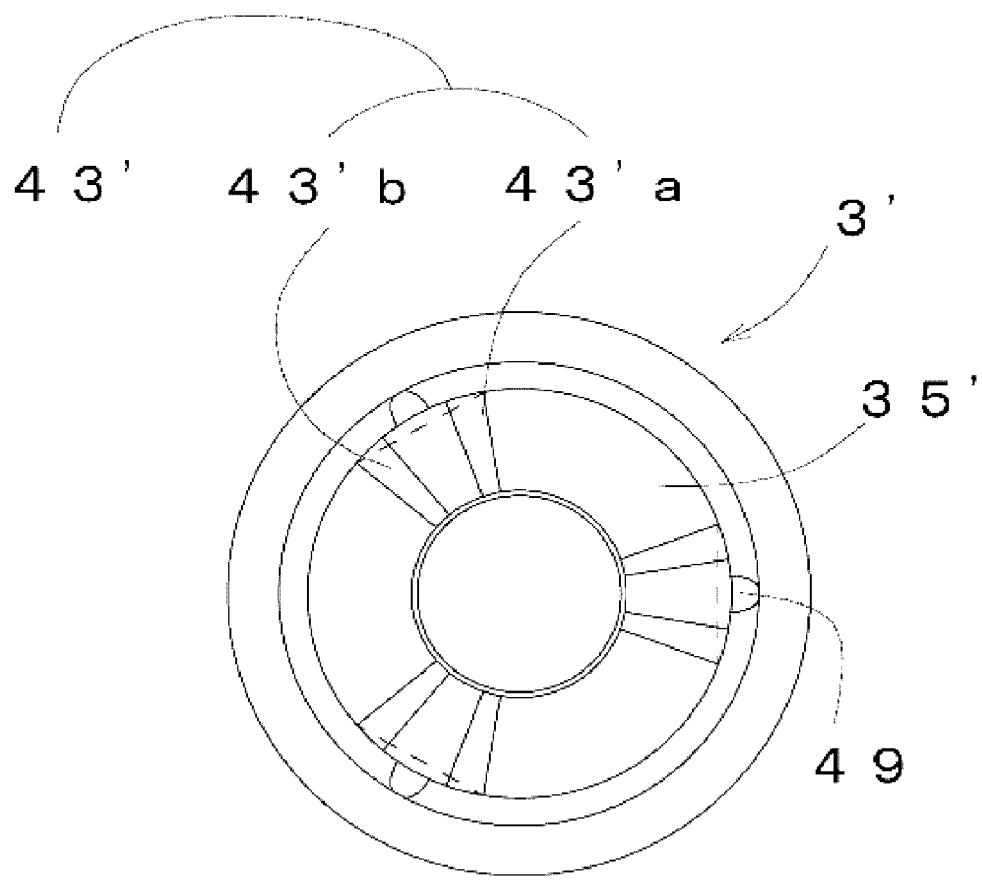
FIG. 8A is a top plan view illustrating a bearing device according to a variant of the first preferred embodiment of the present invention.
Figure 8B:
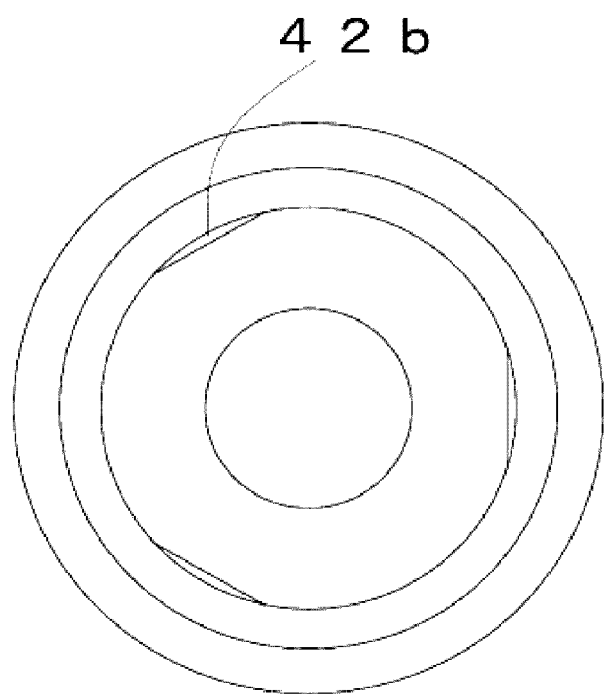
FIG. 8B is a top plan view illustrating the bearing device according to the variant of the first preferred embodiment of the present invention from which a cover member is removed.

With reference to FIGS. 8A, 8B and 9, the bearing device 3' according to a variant of the first preferred embodiment of the present invention will be described. FIG. 8A is a top plan view illustrating the bearing device 3', and FIG. 8B is a top plan view illustrating the bearing device 3' from which the cover member 35' is removed.

In the present variant, the connection portion 49 is located directly above the planar areas 44 of the sleeve 33. In addition, a pair of convex portions 43', that is, convex portions 43'*a* and 43'*b*, radially extends on the plate-like portion 35*a* from portions above circumferential ends of each of the planner areas 44.

Figure 9A:
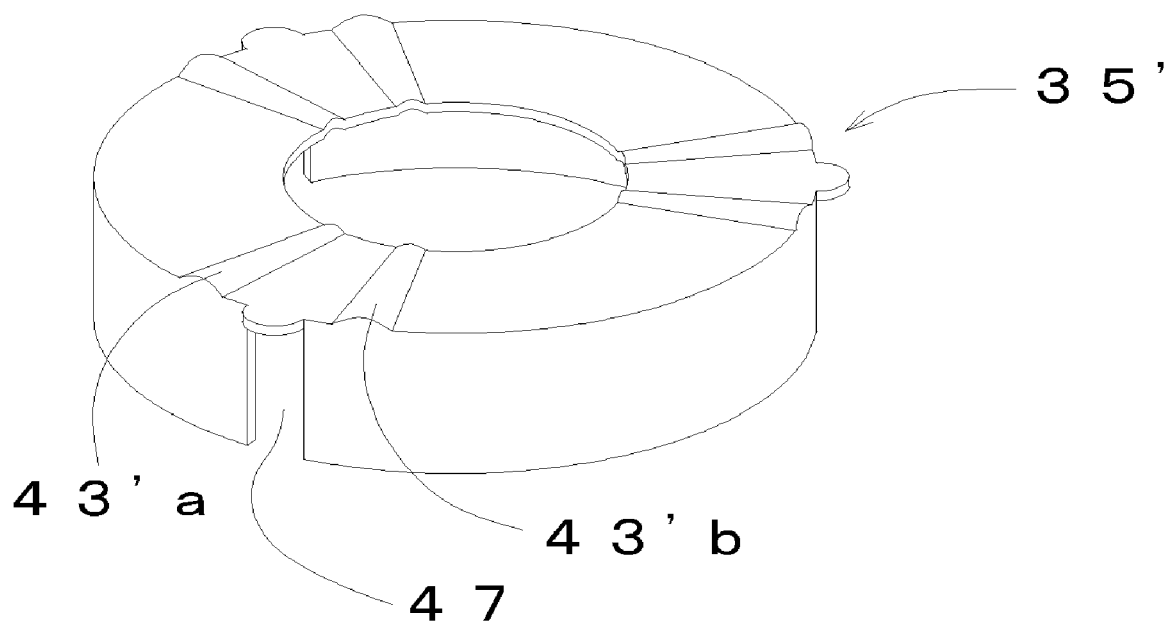
FIG. 9A is a perspective view illustrating a cover member according to the variant of the first preferred embodiment of the present invention.
Figure 9B:
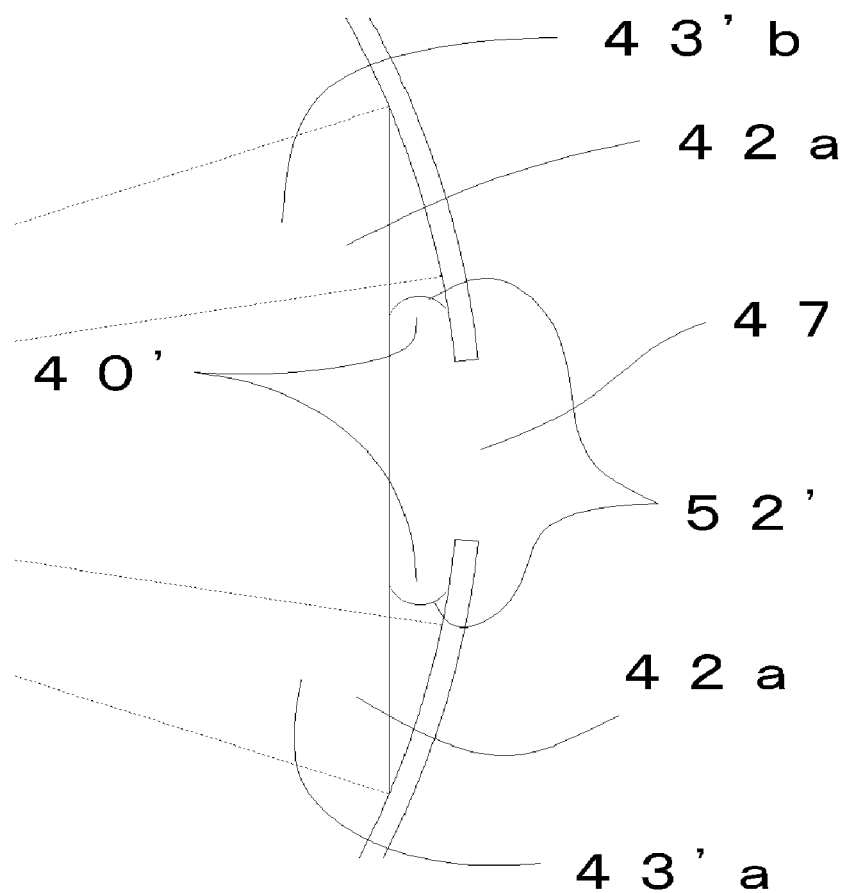
FIG. 9B is a cross sectional view illustrating a first boundary arranged between the cover member and the sleeve of the bearing device according to the variant of the first preferred embodiment of the present invention.

FIG. 9A is a perspective view illustrating a cover member 35' according to the variant of the first preferred embodiment of the present invention. FIG. 9B is a cross sectional view illustrating the first boundary arranged between the cover member 35' and the sleeve 33 of the bearing device 3' according to the variant of the first preferred embodiment of the present invention.

As illustrated in FIG. 9B, the additional seal portions 40' are provided in a circumferentially extending space defined between an inner circumferential surface of the cover member 35' and the outer circumferential surface of the sleeve 33, other than the first seal portion 40. A portion of the first boundary 52' appears at the additional seal portions 40'.

The lubricating oil circulating inside the bearing device flows from a portion with a narrow width of the seal portion 40' into first paths 42*a*, and flows back to the upper portion of the bearing. Even if air bubbles are contained in the lubricating oil, it is difficult for the air bubbles to intrude into the region of the additional seal portion where the width is narrow. Thus, the air bubbles are shoved to the boundary 52' side located in the additional seal portion part 40' and discharged through the slit 47. In this manner, since the first seal portion part 40' functions as an efficient sieve separating the air bubbles in the lubricating oil, the bearing device 3' can discharge the air bubbles in the lubricating oil to outside of the bearing device 3' efficiently.

Second and Third Preferred Embodiments

Figure 10A:
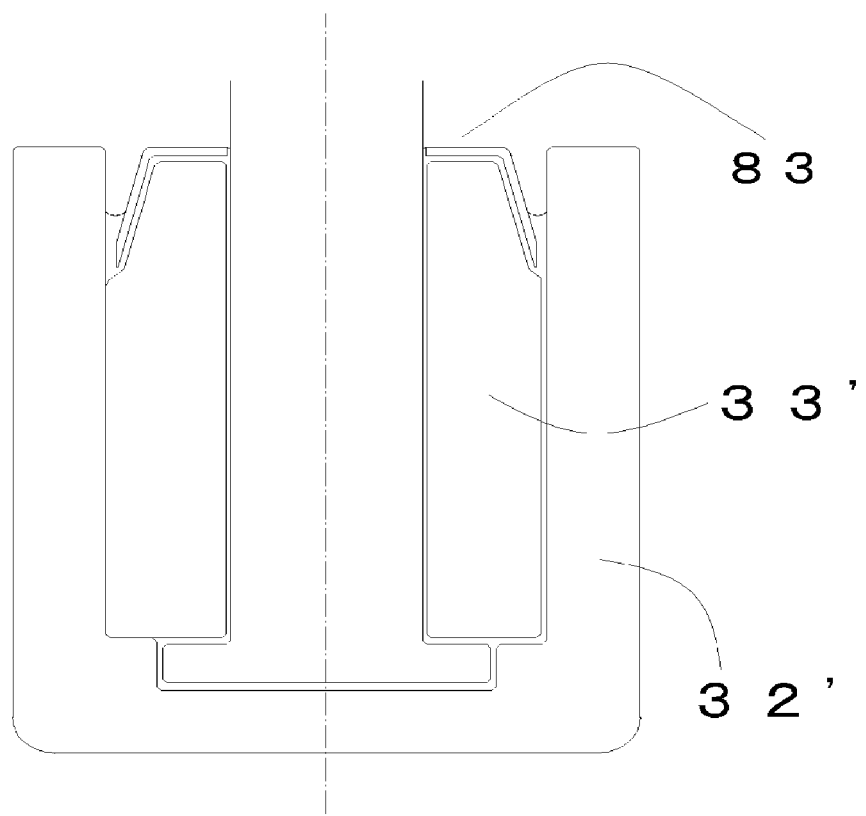
FIG. 10A is a cross sectional view illustrating a bearing device according to a second preferred embodiment of the present invention.
Figure 10B:
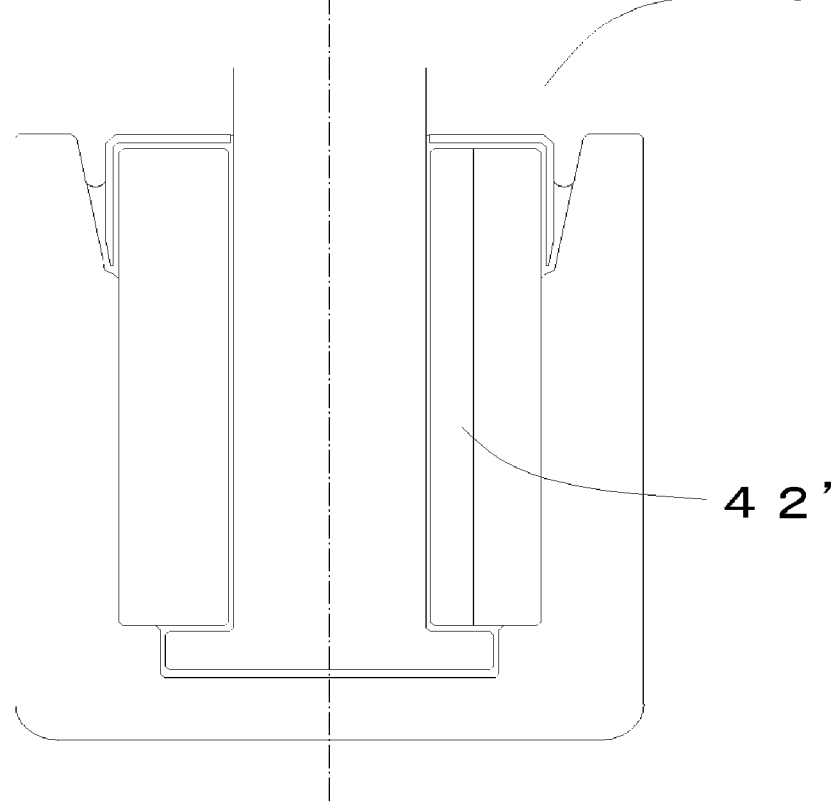
FIG. 10B is a cross sectional view illustrating a bearing device according to a third preferred embodiment of the present invention.

With reference to FIGS. 10A and 10B, a bearing device according to the second and third preferred embodiments of the present invention will be described. FIG. 10A is a cross sectional view illustrating a bearing device 83 according to the second preferred embodiment of the present invention. FIG. 10B is a cross sectional view illustrating the bearing device 93 according to the third preferred embodiment of the present invention.

As illustrated in FIG. 10A, by reducing an external diameter of a sleeve 33' at an axially upper portion thereof, the first seal portion may be formed without providing a slanted surface in a radially inner side of a housing 32'. The sleeve 33' may be a copper based porous sintered body, and the tapered shape is formed simultaneously when the powder material is pressed.

In FIG. 10B, a path 42' may be defined with a through hole axially penetrating the sleeve 33. Since the length of circulation route of the lubricating oil becomes short, the lubricating liquid smoothly circulates in the bearing device 93, stabilizing the bearing property.

Fourth Preferred Embodiment

Figure 11A:
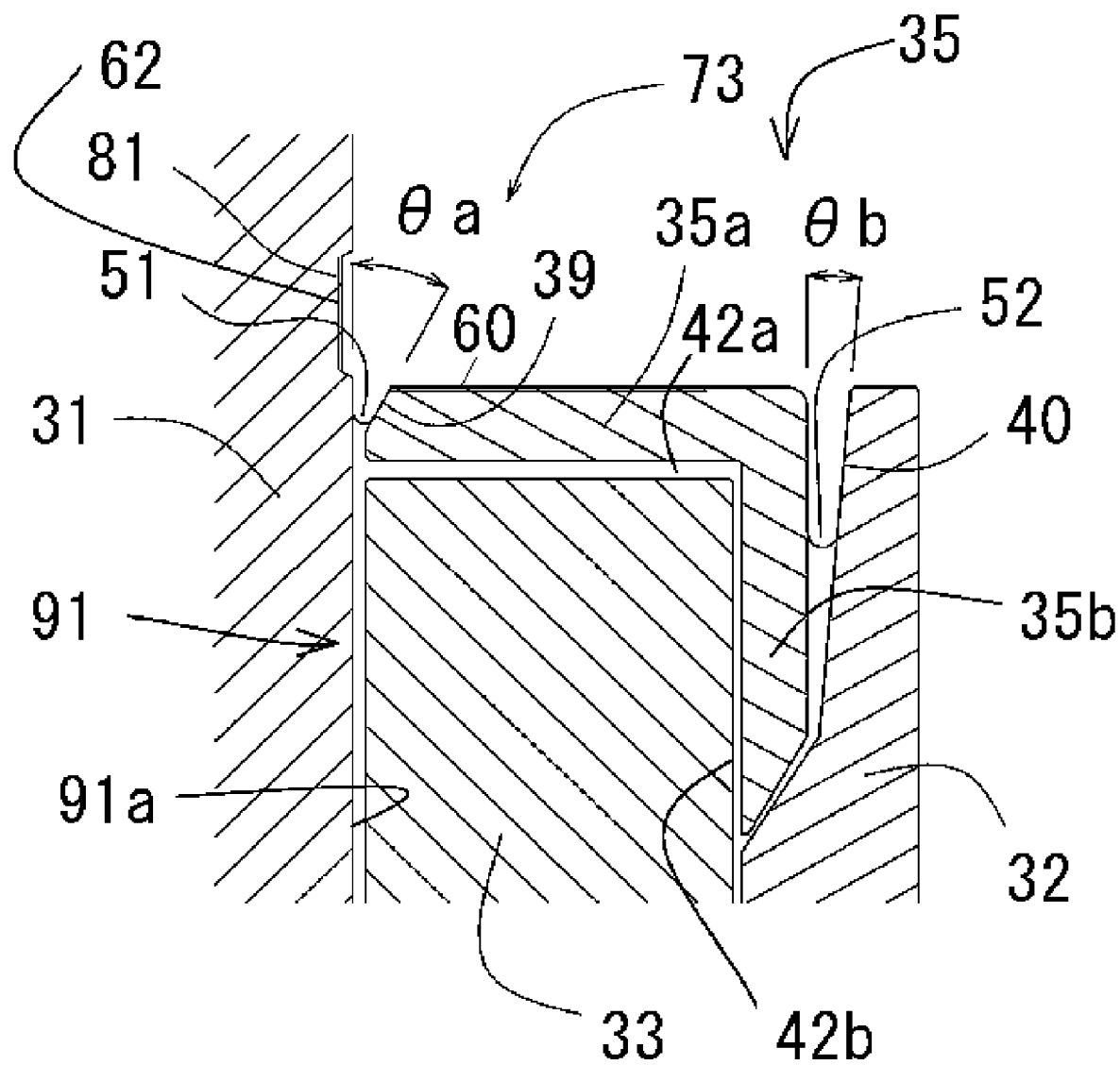
FIG. 11A is a cross sectional view illustrating a principle portion of a bearing device according to a fourth preferred embodiment of the present invention.
Figure 11B:
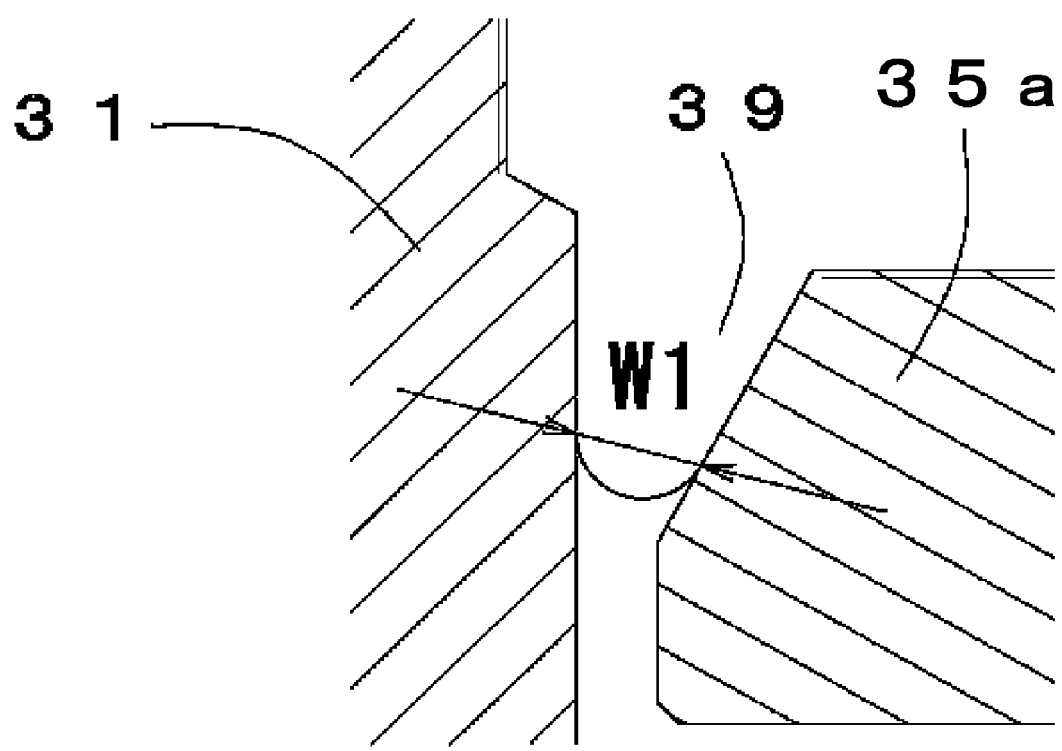
FIG. 11B is a cross sectional view illustrating a portion of the bearing device near a first boundary in a magnified manner.
Figure 11C:
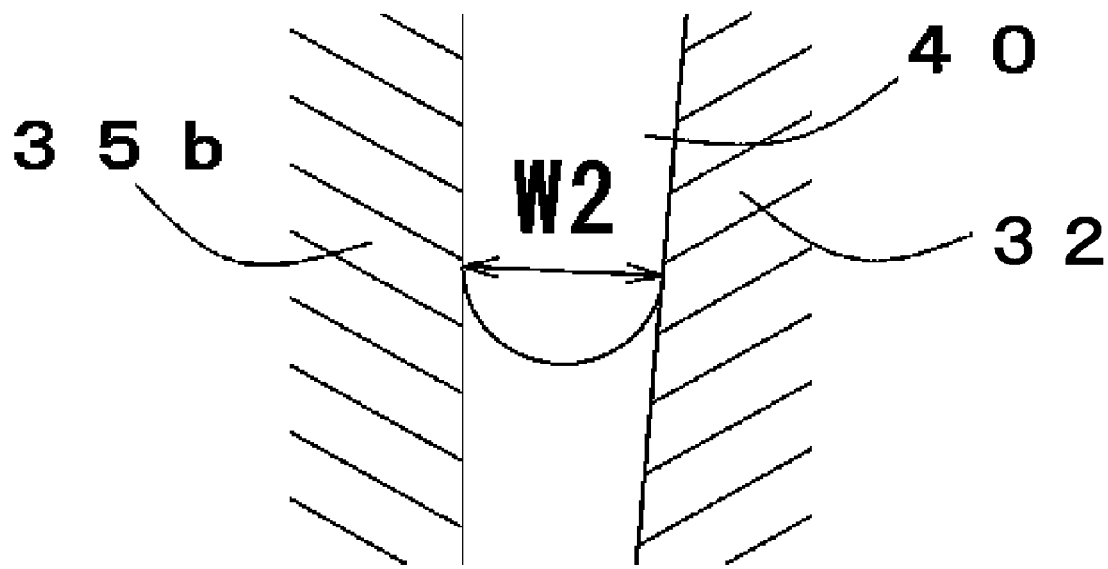
FIG. 11C is a cross sectional view illustrating a portion of the bearing device near a second boundary in a magnified manner.

With reference to FIGS. 11A, 11B, and 11C, a bearing device according to a fourth preferred embodiment of the present invention will be described in detail.

FIG. 11A is a cross sectional view illustrating a principle portion of a bearing device 73 according to the fourth preferred embodiment of the present invention. FIG. 11B is a cross sectional view illustrating a portion of the bearing device 73 near the first boundary 52 in a magnified manner. FIG. 11C is a cross sectional view illustrating a portion of the bearing device 73 near the second boundary 51 in a magnified manner.

As illustrated in FIG. 11A, the inner circumferential surface of the cover member 35 is chamfered. The inner circumferential surface opposes the outer circumferential surface of the shaft 31 to form a second seal portion 39. In the present preferred embodiment of the present invention, a taper angle of θa of the second seal portion 39 is greater than a taper seal portion θb of the first taper seal portion. For example, a taper angle θa of the second seal portion 39 is about 34 degrees, and a taper angle θb of the first seal portion 40 is about 5 degrees. The angle θa and θb may be variously modified. θa may preferably be within the range of about 15 degrees to about 50 degrees, and θb may preferably be within the range of about 3 degrees to about 10 degrees, for example.

In order to stabilize the boundary, it is desirable that the surfaces defining the seal portion have sufficient wettability. The width W1 of the second boundary 51 is narrower than a width W2 of the first boundary 52.

The oil-repellent layers 60, 62 are arranged radially outside and axially upside of the second tapered seal portion. As illustrated in FIG. 11A, portions where the oil-repellent layers 60, 62 are arranged are indicated by double lines. In the outer circumferential surface of the shaft 31, an annular concave portion 81 is formed, and the oil-repellent layer 62 is arranged in the annular concave portion 81. The effect of providing the annular concave portion 81 is analogous to that of the diameter reduced portion illustrated in FIG. 7. By providing the oil-repellent layer 62 in the annular concave portion, it is possible to prevent the oil-repellent layer 62 from being removed due to the contact between the cover member 35 and the shaft 31.

As illustrated FIG. 11A, the oil-repellent layer 60 does not extend into the second seal portion 39.

In the bearing device 73, the outflow of the lubricating oil from the radial gap is inhibited by the second seal portion. The oil-repellent layer inhibits further movement toward the outside in the case where the boundary axially upwardly moves to an axially upper end of the seal portion.

Fifth Preferred Embodiment

Figure 12A:
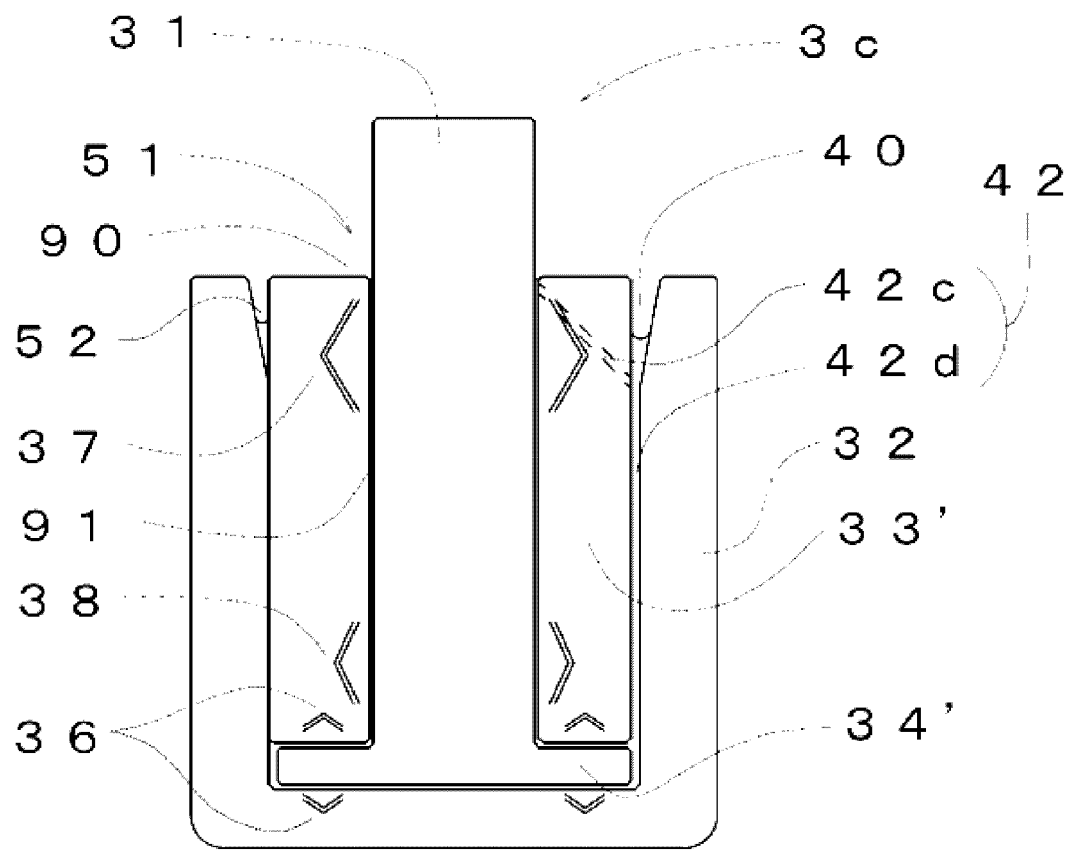
FIG. 12A is a cross sectional view illustrating a bearing device according to a fifth preferred embodiment of the present invention.
Figure 12B:
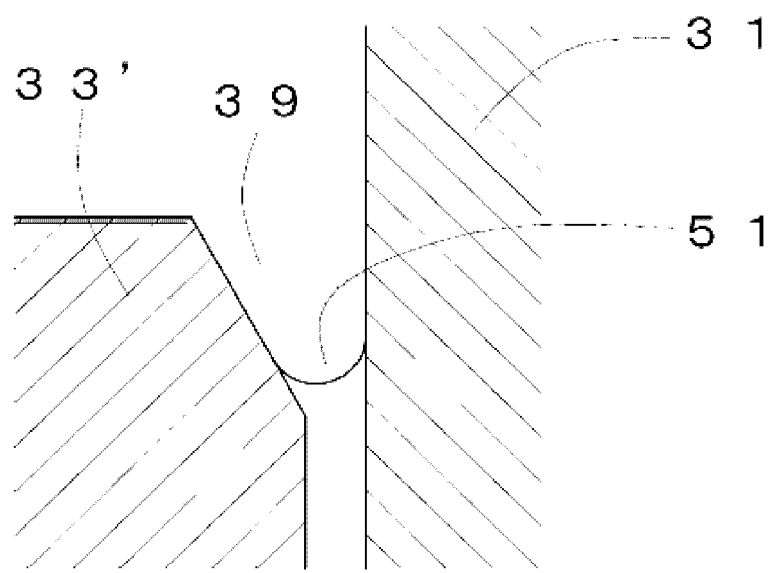
FIG. 12B is a cross sectional view illustrating a portion of the bearing device near a second boundary in a magnified manner.

With reference to FIGS. 12A and 12B, a fifth preferred embodiment of the present invention will be described in detail. FIG. 12A is a cross sectional view illustrating a bearing device 3b according to the fifth preferred embodiment of the present invention. FIG. 12B is a cross sectional view illustrating a portion of the bearing device 3c near the second boundary 51 in a magnified manner.

Unlike the bearing device 3 as illustrated in FIG. 3, the bearing device 3c does not include the cover member 35. As illustrated in FIG. 12A, an upper end portion of a radial gap 91 is connected to the path 42d via through a connecting path 42c. In the upper end portion of the radial gap 91, the second boundary 51 is provided. The oil repellent area 90 is arranged on a portion of the axially upper portion of the sleeve 33' at an area around the bearing cavity. A thrust plate 34' is arranged at an axially lower end portion of the shaft 31 such that an axially upper surface of the thrust plate 34' axially opposes a lower end surface of the sleeve 33'.

The radial dynamic pressure bearing mechanisms are arranged so as to be axially separated from each other. An upper end of the upper radial dynamic pressure bearing mechanism 37 is arranged in the vicinity of the upper end of the radial gap 91. Thus, the radial dynamic pressure bearing mechanism 37 can be arranged so as to be axially separated from the lower radial dynamic pressure bearing mechanism 38. Since the distance between supporting points (at each point, the dynamic pressure is highest in each bearing mechanism) of the radial bearings 37, 38 is enlarged, rigidity against an external force applied in a direction inclining the shaft 31 is increased. Unlike the bearing device 3, the bearing device 3c does not include the cover member 35, thus the distance between the supporting points of the radial bearings becomes longer in an amount corresponding to the axial thickness of the cover member 35.

The thickness of the cover member 35 is not significant in the case where a height of the bearing is comparatively large. However, in the thin bearing having a reduced axial height, the thickness of the cover member has an influence that cannot be ignored. In such an application, the bearing device 3b may be preferably applied.

Sixth Preferred Embodiment

Figure 13A:
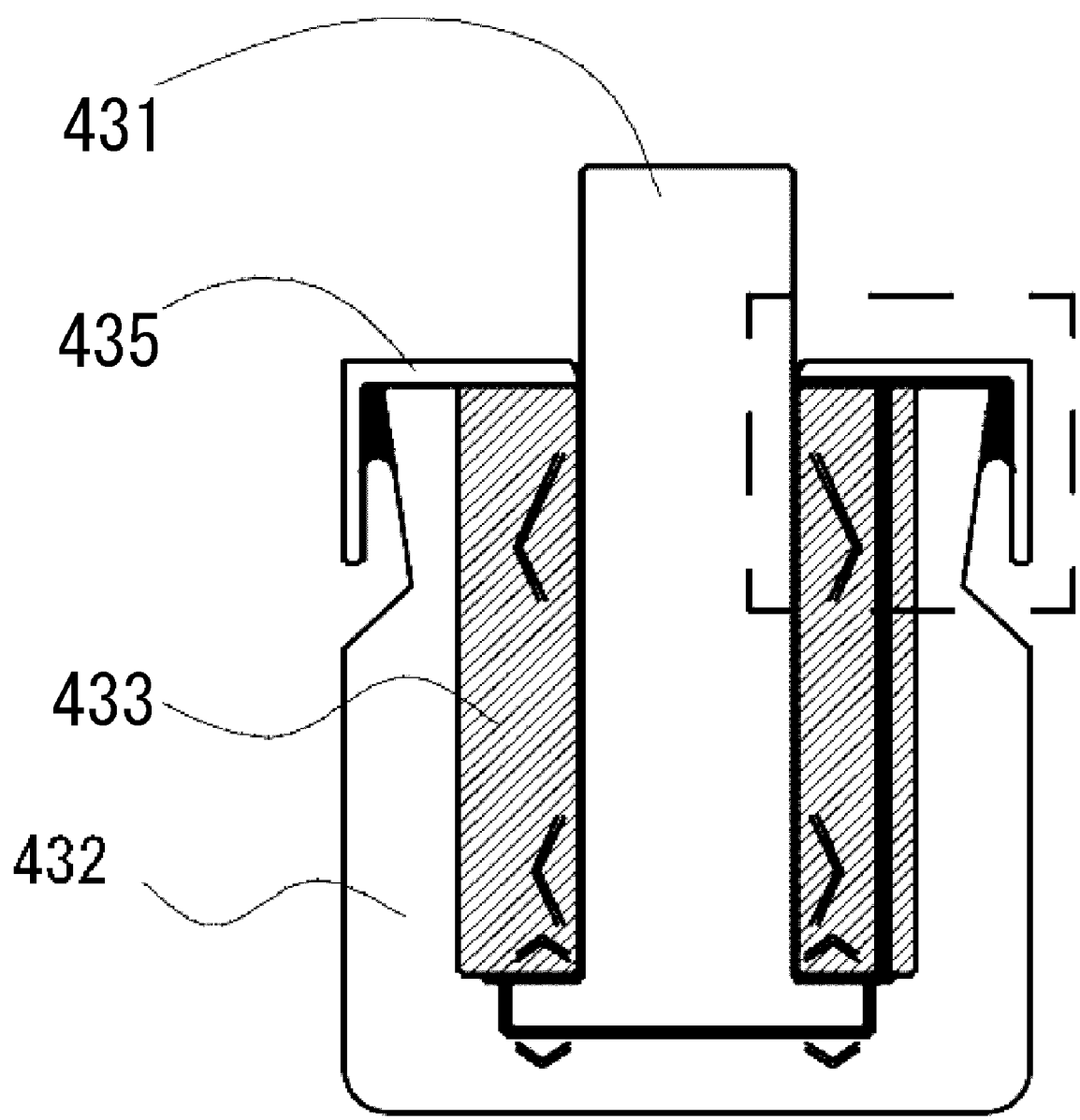
FIG. 13A is a cross sectional view illustrating a bearing device according to a sixth preferred embodiment of the present invention.
Figure 13B:
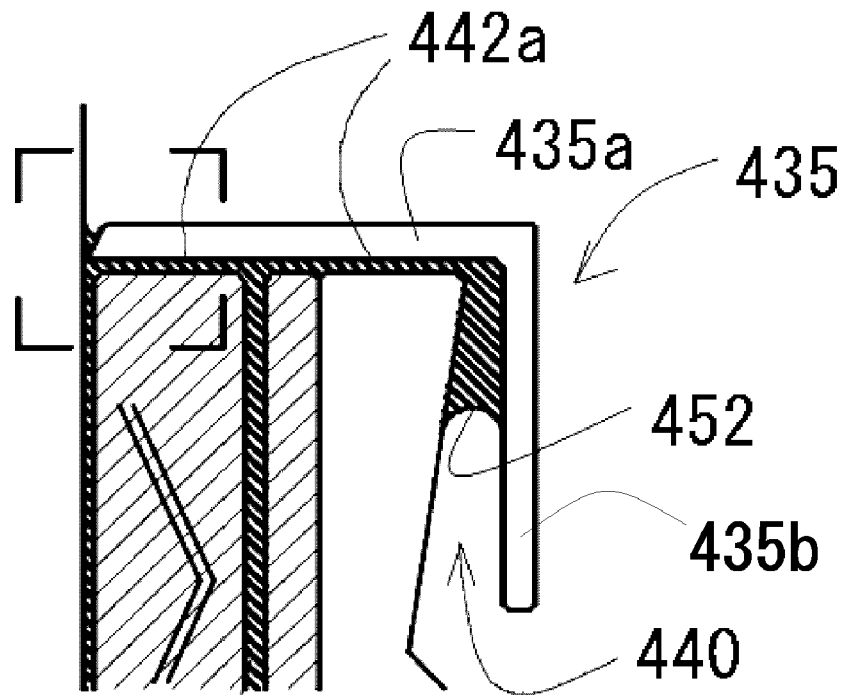
FIG. 13B is a cross sectional view illustrating a portion of the bearing device near a first boundary in a magnified manner.
Figure 13C:
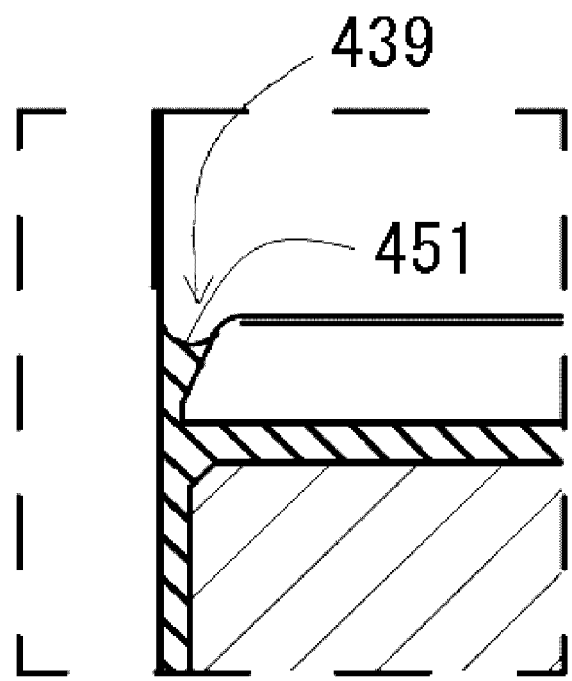
FIG. 13C is a cross sectional view illustrating a portion of the bearing device near a second boundary in a magnified manner.

Hereinafter, with reference to FIGS. 13A, 13B, and 13C, a bearing device according to a sixth preferred embodiment of the present invention will be described in detail. Note that in FIGS. 13A to 13C, elements similar to those illustrated in the foregoing description are denoted by similar or the same reference numerals and description thereof is omitted. FIG. 13A is a cross sectional view illustrating a bearing device according to the sixth preferred embodiment of the present invention. FIG. 13B is a cross sectional view illustrating a portion of the bearing device near a first boundary in a magnified manner. FIG. 13C is a cross sectional view illustrating a portion of the bearing device near a second boundary in a magnified manner.

As illustrated in FIG. 13B, a first seal portion 440 is defined between a side wall portion 435b of the cover member 435 and an upper portion of an outer circumferential surface of the housing 432, radially opposing each other via a gap. A clearance of the gap in the radial direction gradually increases toward an axially lower direction. The lubricating oil meets the outside air in the first seal portion 440, defining a first boundary 452 in the first seal portion 440.

As illustrated in FIG. 13C, a second seal portion 439 is defined between an inner circumferential surface of a plate-like portion 435a of the cover member 435 and an outer circumferential surface of the shaft 431, radially opposing each other via a gap. A clearance of the gap in the radial direction gradually increases toward an axially upper direction. The lubricating oil meets the outside air in the second seal portion 439, defining a second boundary 451 in the second seal portion 439.

The first seal portion 440 and the second seal portion 439 are connected via first paths 442a. The first paths 442a are defined by a gap between an axially lower surface of the plate-like portion 435a of the cover member 435 and the axially upper surface of the sleeve 433.

Seventh Preferred Embodiment

Figure 14A:
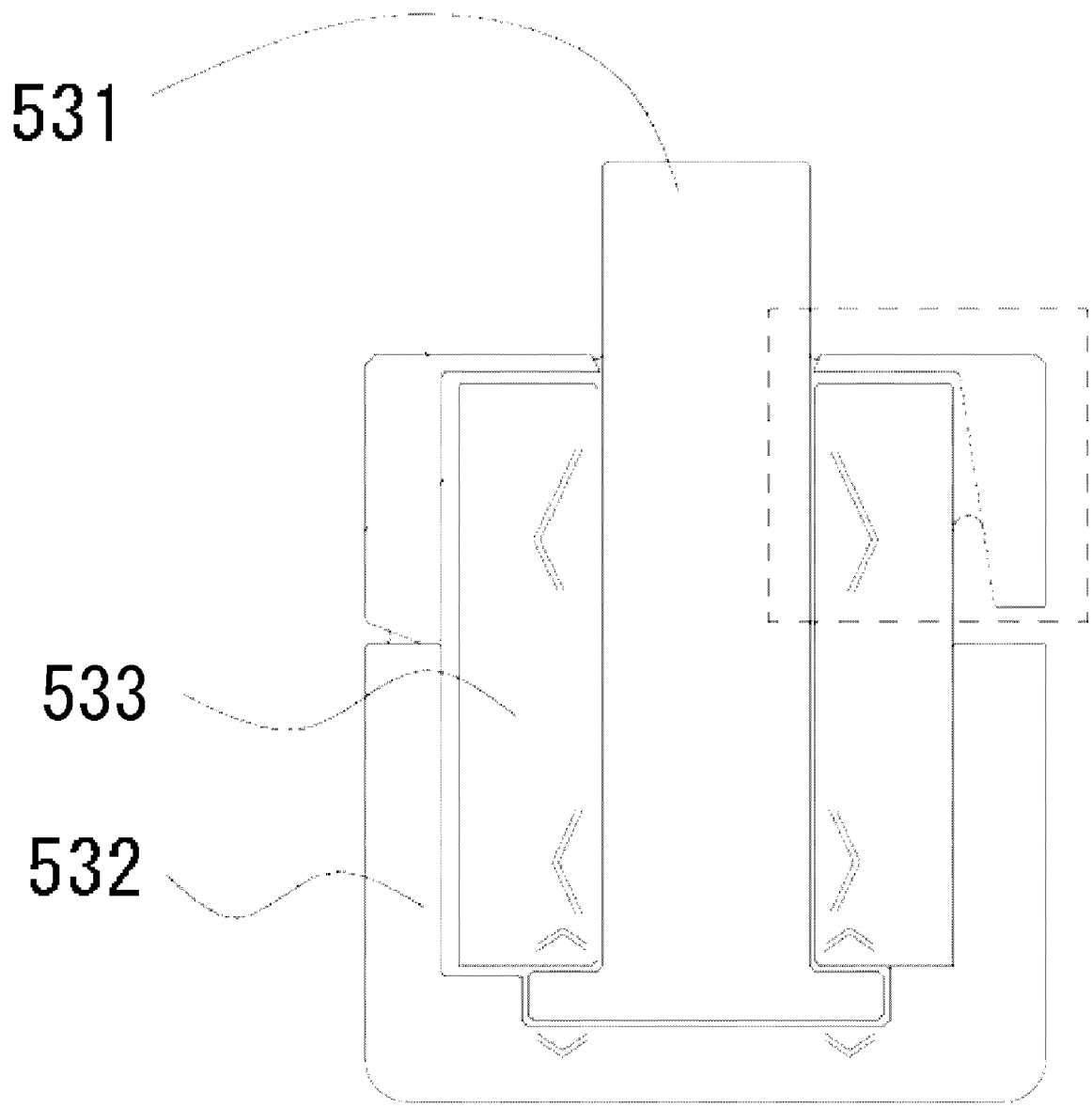
FIG. 14A is a cross sectional view illustrating a bearing device according to a seventh preferred embodiment of the present invention.
Figure 14B:
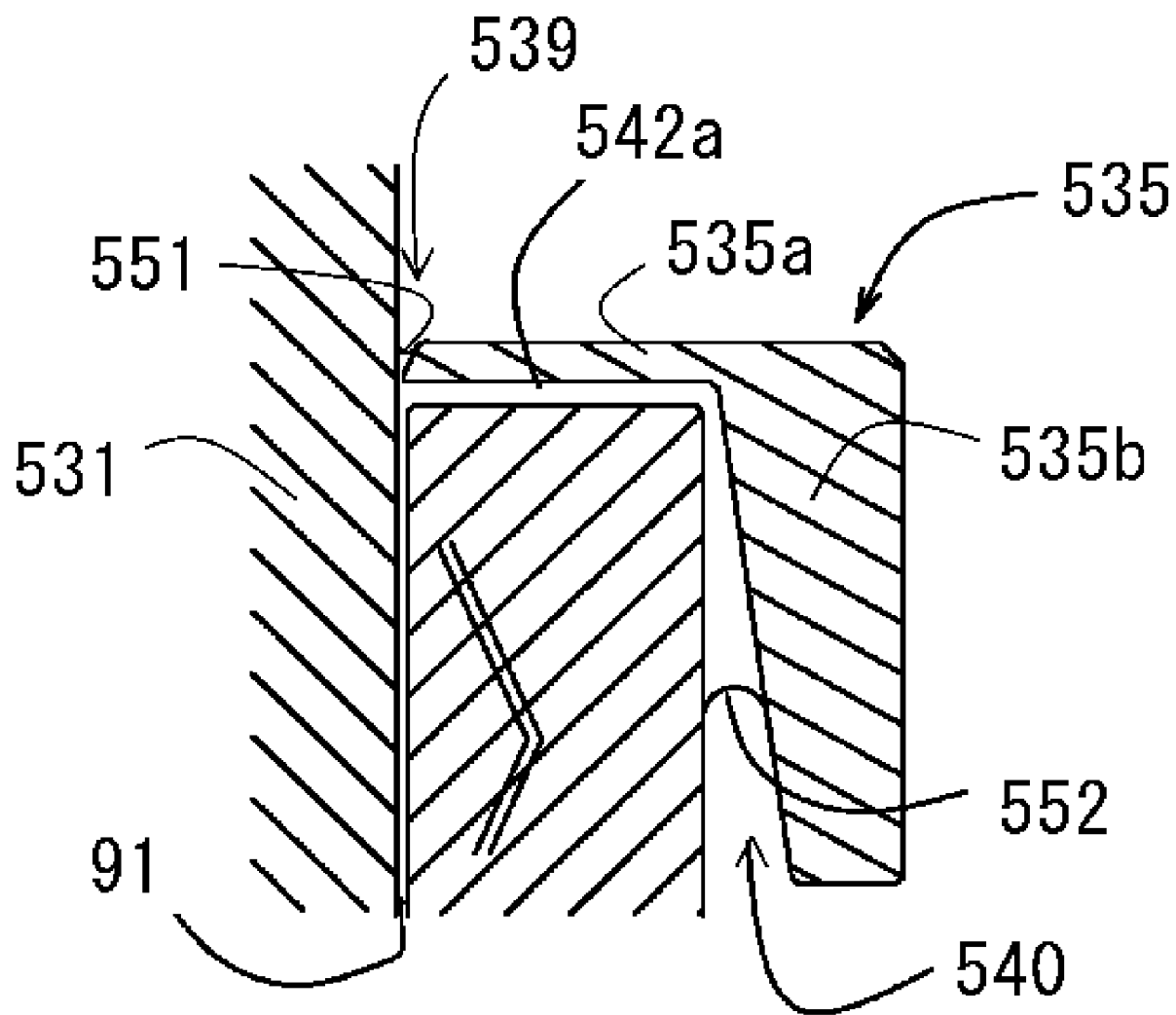
FIG. 14B is a cross sectional view illustrating a portion of the bearing device near a first boundary in a magnified manner.

Hereinafter, with reference to FIGS. 14A, and 14B, a bearing device according to a seventh preferred embodiment of the present invention will be described in detail. Note that in FIGS. 14A and 14B, elements similar to those illustrated in the foregoing description are denoted by similar or the same reference numerals, and description thereof is omitted. FIG. 14A is a cross sectional view illustrating a bearing device according to the seventh preferred embodiment of the present invention. FIG. 14B is a cross sectional view illustrating a portion of the bearing device near a first boundary in a magnified manner.

As illustrated in FIG. 14B, a first seal portion 540 is defined between a side wall portion 535b of the cover member 535 and an upper portion of an outer circumferential surface of the sleeve 533, radially opposing each other via a gap. A clearance of the gap in the radial direction gradually increases toward an axially lower direction. The lubricating oil meets the outside air in the first seal portion 540, defining a first boundary 552 in the first seal portion 540.

A second seal portion 539 is defined between an inner circumferential surface of a plate-like portion 535a of the cover member 535 and an outer circumferential surface of the shaft 531 provided in the housing 532, radially opposing each other via a gap. A clearance of the gap in the radial direction gradually increases toward an axially upper direction. The lubricating oil meets the outside air in the second seal portion 539, defining a second boundary 551 in the second seal portion 539.

The first seal portion 540 and the second seal portion 539 are connected via first paths 542a. The first paths 542a are defined by a gap between an axially lower surface of the plate-like portion 535a of the cover member 535 and the axially upper surface of the sleeve 533.

Eighth Preferred Embodiment

Figure 15A:
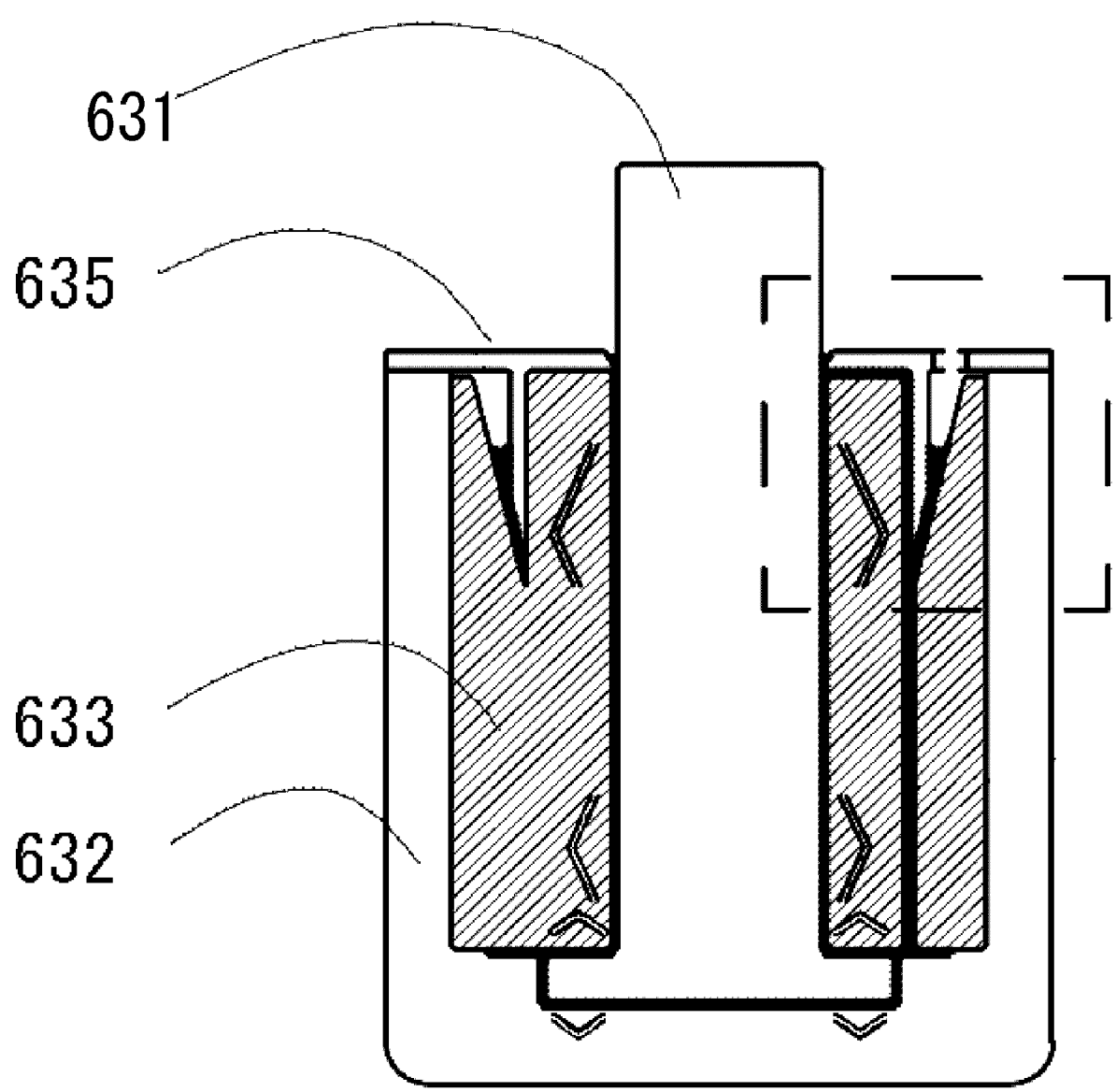
FIG. 15A is a cross sectional view illustrating a bearing device according to an eighth preferred embodiment of the present invention.
Figure 15B:
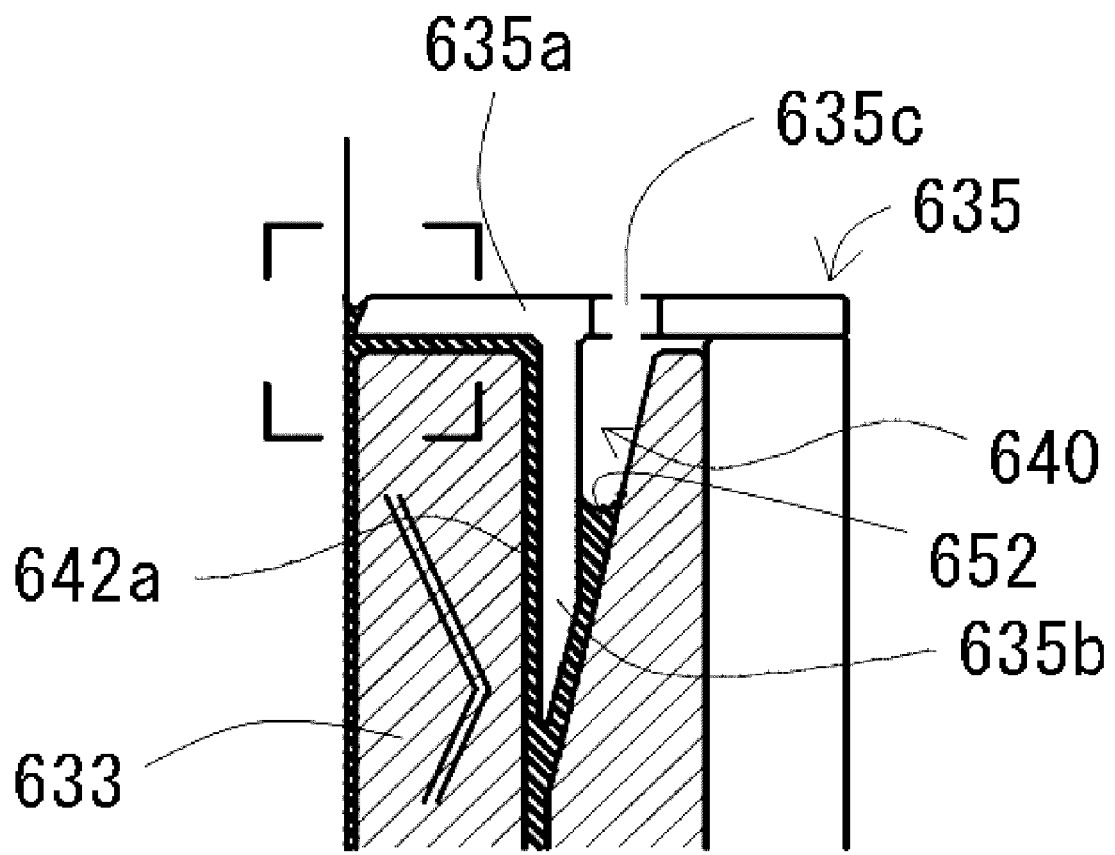
FIG. 15B is a cross sectional view illustrating a portion of the bearing device near a first boundary in a magnified manner.
Figure 15C:
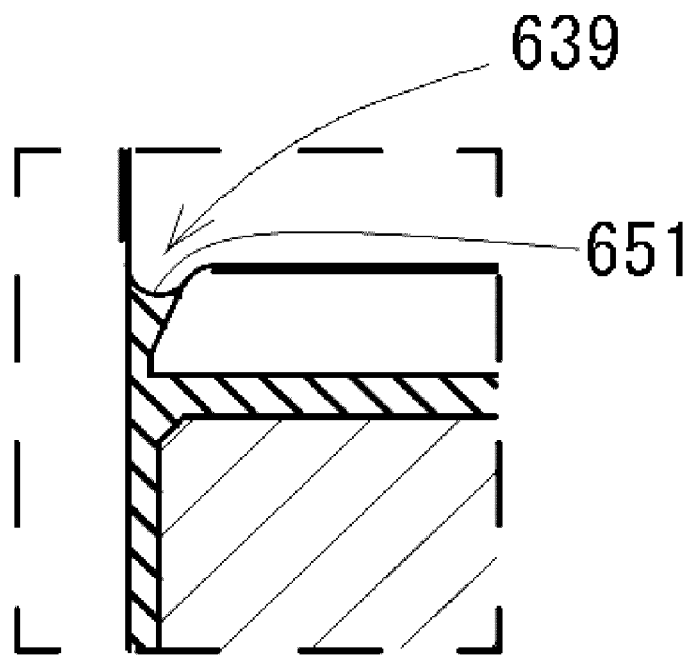
FIG. 15C is a cross sectional view illustrating a portion of the bearing device near a second boundary in a magnified manner.

Hereinafter, with reference to FIGS. 15A, 15B, and 15C, a bearing device according to an eighth preferred embodiment of the present invention will be described in detail. Note that in FIGS. 15A to 15C, elements similar to those illustrated in the foregoing description are denoted by similar or the same reference numerals, and description thereof is omitted. FIG. 15A is a cross sectional view illustrating a bearing device according to the eighth preferred embodiment of the present invention. FIG. 15B is a cross sectional view illustrating a portion of the bearing device near a first boundary in a magnified manner. FIG. 15C is a cross sectional view illustrating a portion of the bearing device near a second boundary in a magnified manner.

As illustrated in FIG. 15B, a first seal portion 640 is defined between an outer circumferential surface of a side wall portion 635b of the cover member 635 and a circumferential surface of the sleeve 633 radially opposing the outer circumferential surface of the side wall portion 635a via a gap. A clearance of the gap in the radial direction gradually increases toward an axially upper direction. The lubricating oil meets the outside air in the first seal portion 640, defining a first boundary 652 in the first seal portion 640.

In the present preferred embodiment of the present invention, the cover member 635 includes a through hole 635c axially penetrating the plate-like portion 635a of the cover member 635. The through hole 635c axially connects the first seal portion and outside of the bearing device, and via the through hole 635c, the lubricating oil is injected into the bearing device. The cover member 635 is fixed to the sleeve 633 and/or the housing 632.

As illustrated in FIG. 15C, a second seal portion 639 is defined between an inner circumferential surface of a plate-like portion 635a of the cover member 635 and an outer circumferential surface of the shaft 631, radially opposing each other via a gap. A clearance of the gap in the radial direction gradually increases toward an axially upper direction. The lubricating oil meets the outside air in the second seal portion 639, defining a second boundary 651 in the second seal portion 639.

The first seal portion 640 and the second seal portion 639 are connected via a first path 642a. The first path 642a is defined by a gap between an axially lower surface of the plate-like portion 635a of the cover member 635 and the axially upper surface of the sleeve 633, and another gap between an inner circumferential surface of the wall portion 635b and a circumferential surface of the sleeve 633 radially opposing each other.

Ninth Preferred Embodiment

Figure 16A:
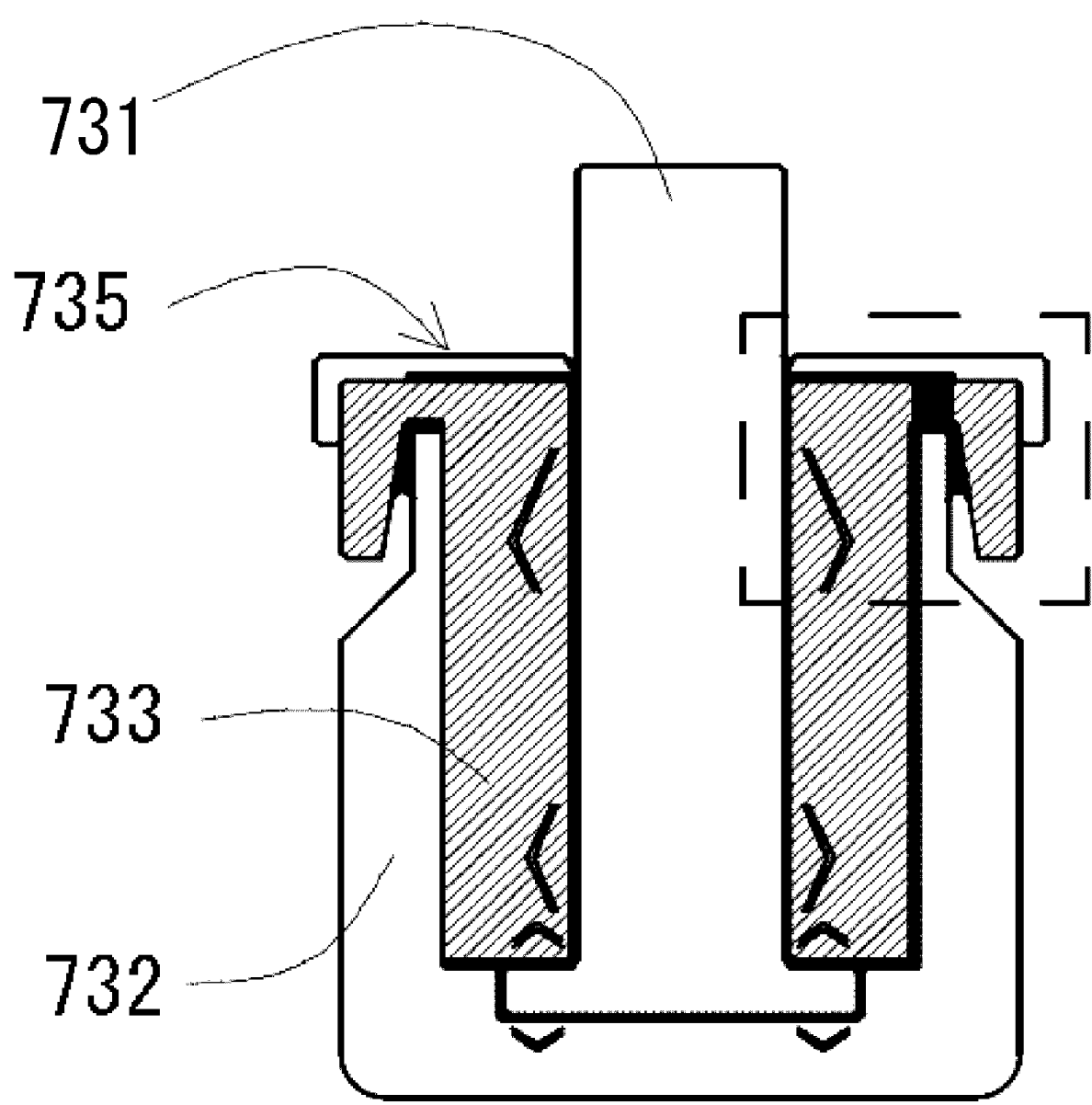
FIG. 16A is a cross sectional view illustrating a bearing device according to a ninth preferred embodiment of the present invention.
Figure 16B:
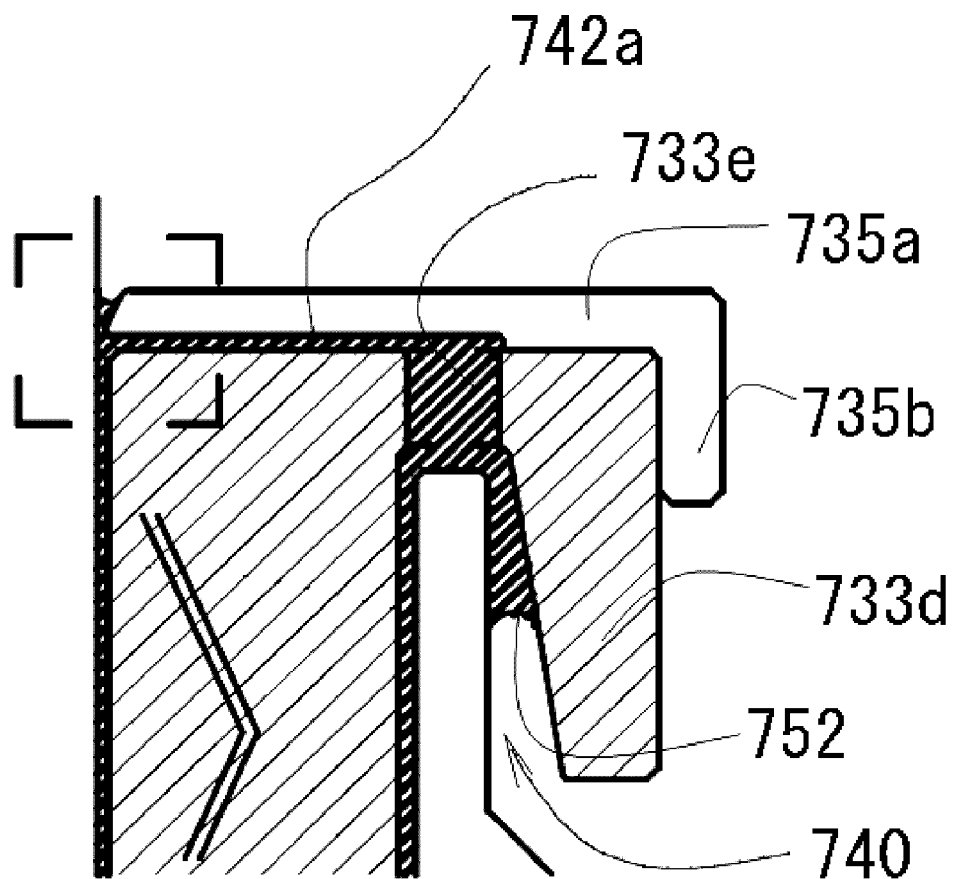
FIG. 16B is a cross sectional view illustrating a portion of the bearing device near a first boundary in a magnified manner.
Figure 16C:
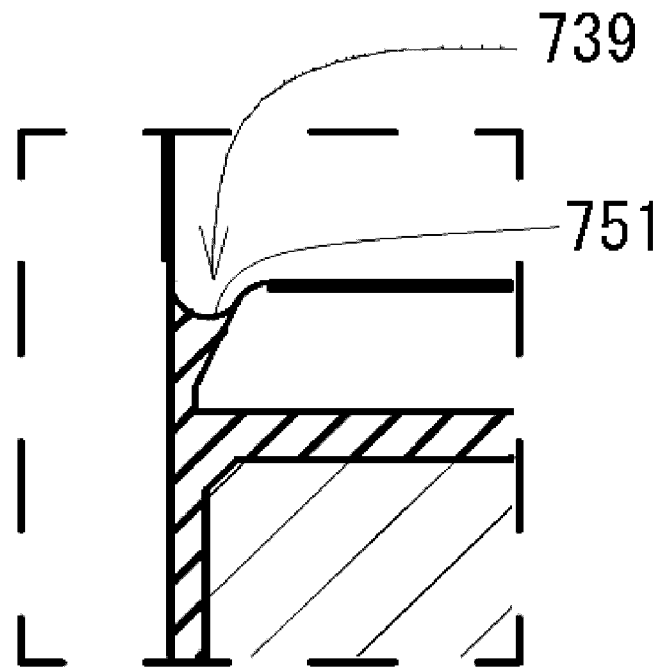
FIG. 16C is a cross sectional view illustrating a portion of the bearing device near a second boundary in a magnified manner.

Hereinafter, with reference to FIGS. 16A, 16B, and 16C, a bearing device according to a ninth preferred embodiment of the present invention will be described in detail. Note that in FIGS. 16A to 16C, elements similar to those illustrated in the foregoing description are denoted by similar or the same reference numerals, and description thereof is omitted. FIG. 16A is a cross sectional view illustrating a bearing device according to the ninth preferred embodiment of the present invention. FIG. 16B is a cross sectional view illustrating a portion of the bearing device near a first boundary in a magnified manner. FIG. 16C is a cross sectional view illustrating a portion of the bearing device near a second boundary in a magnified manner.

As illustrated in FIG. 16B, the sleeve 733 includes an inner cylindrical portion, an discoid portion radially outwardly extending from an axially upper portion of the inner cylindrical portion, and an outer cylindrical portion 733d axially downwardly extending from a radially outer end of the discoid portion, adjacent a wall portion 735b extending axially downwardly from a radially outer end of a plate-like portion 735a. The outer cylindrical portion 733d radially opposes the inner cylindrical portion of the inner cylindrical portion via a space therebetween, and an axially upper portion of the housing 732 is arranged in the space. A first seal portion 740 is defined between the outer cylindrical portion 733d and an axially upper portion of the housing 732, radially opposing each other via a gap. A clearance of the gap in the radial direction gradually increases toward an axially lower direction. The lubricating oil meets the outside air in the first seal portion 740, defining a first boundary 752 in the first seal portion 740.

As illustrated in FIG. 16C, a second seal portion 739 is defined between an inner circumferential surface of a plate-like portion 735a of the cover member 735 and an outer circumferential surface of the shaft 731, radially opposing each other via a gap. A clearance of the gap in the radial direction gradually increases toward an axially upper direction. The lubricating oil meets the outside air in the second seal portion 739, defining a second boundary 751 in the second seal portion 739.

The first seal portion 740 and the second seal portion 739 are connected via a first path 742a. The first path 742a is defined by a through hole 733e and a gap between an axially lower surface of the plate-like portion 735a of the cover member 735 and the axially upper surface of the sleeve 733.

Variations of the Preferred Embodiments

Figure 17A:
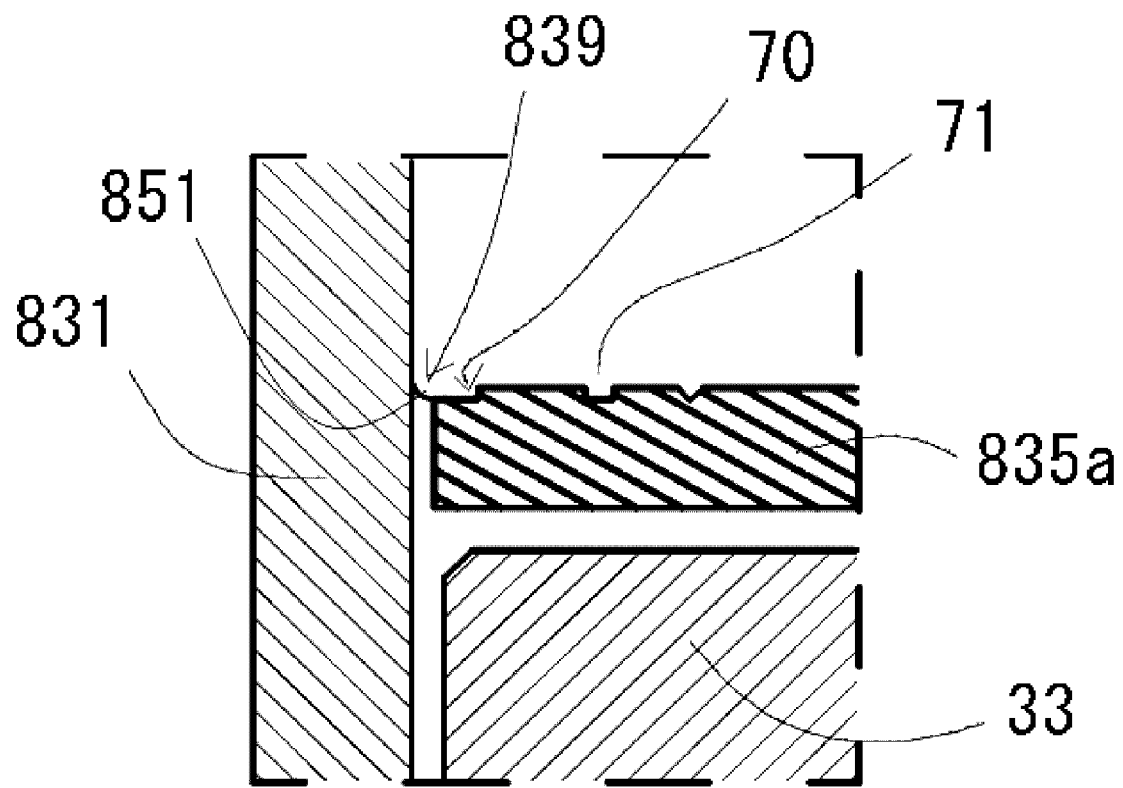
FIG. 17A is a cross sectional view illustrating a portion of the bearing device near a second boundary in a magnified manner according to another variant of the first preferred embodiment of the present invention.
Figure 17B:
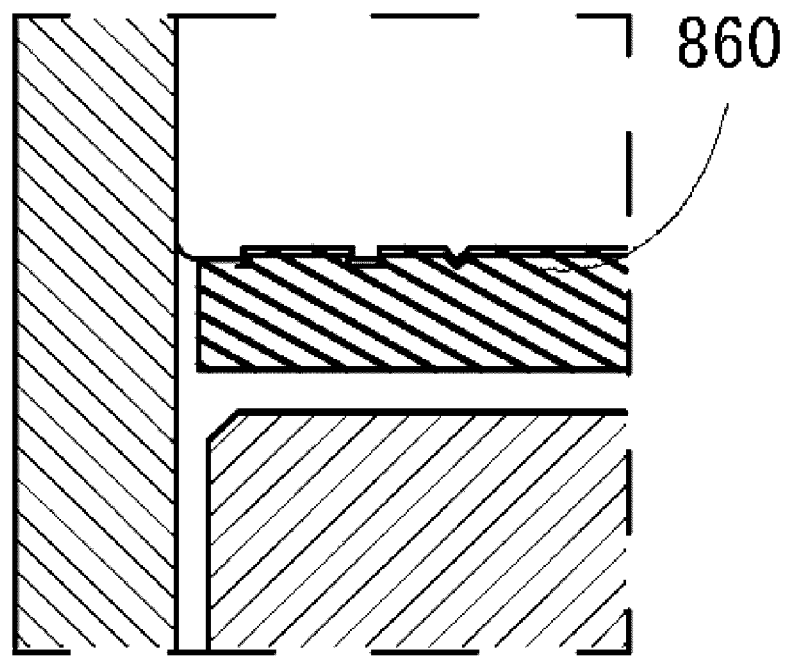
FIG. 17B is a cross sectional view illustrating a portion of the bearing device near a second boundary in a magnified manner according to still another variant of the first preferred embodiment of the present invention.
Figure 17C:
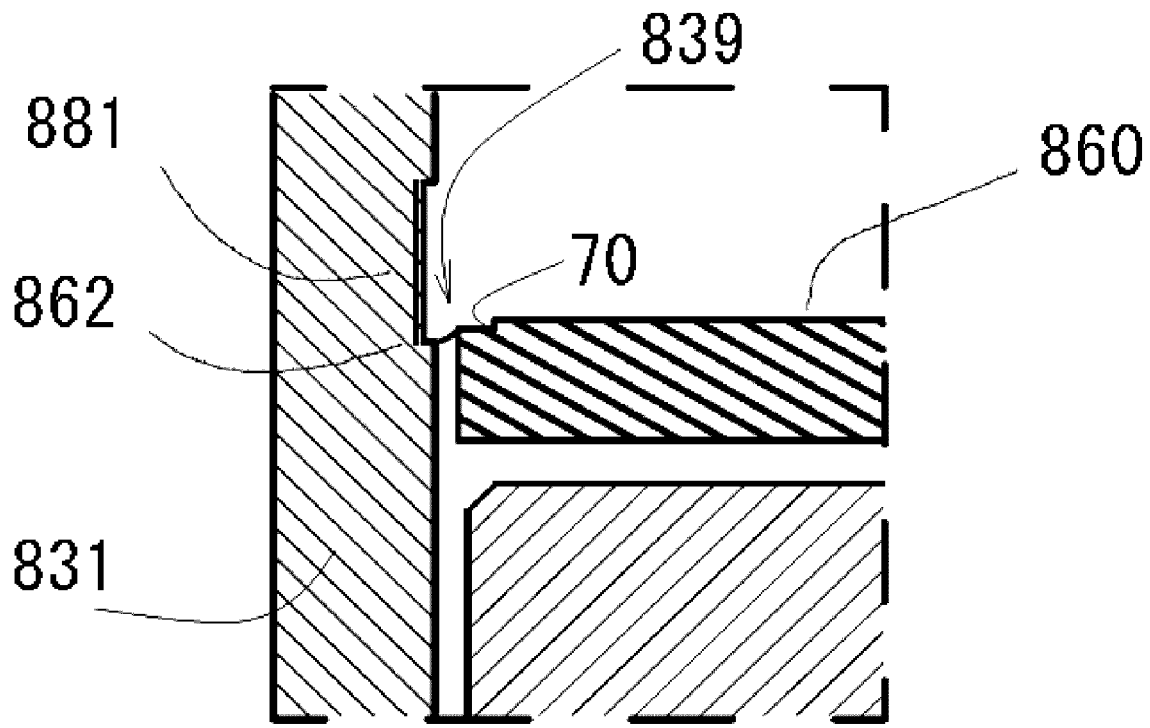
FIG. 17C is a cross sectional view illustrating a portion of the bearing device near a second boundary in a magnified manner according to yet another variant of the first preferred embodiment of the present invention.

Hereinafter, with reference to FIGS. 17A, 17B, and 17C, a bearing device according to variants of the first preferred embodiment of the present invention will be described in detail. Note that in FIGS. 17A to 17C, elements similar to those illustrated in the foregoing description are denoted by similar or the same reference numerals, and description thereof is omitted. FIG. 17A is a cross sectional view illustrating a portion of the bearing device near a second boundary in a magnified manner according to a variant of the first preferred embodiment of the present invention. FIG. 17B is a cross sectional view illustrating a portion of the bearing device near the second boundary in a magnified manner according to another variant of the first preferred embodiment of the present invention. FIG. 17C is a cross sectional view illustrating a portion of the bearing device near the second boundary in a magnified manner according to yet another variant of the first preferred embodiment of the present invention.

As illustrated in FIG. 17A, a second seal portion 839 is defined between the inner circumferential surface of the plate-like portion 835a and the outer circumferential surface of the shaft 831, radially opposing each other via a gap. In the variant of the present preferred embodiment of the present invention, the clearance of the gap is substantially the same across the second seal portion 839.

A concave portion 70 (a step 70) is located at a radially inner end of the axially upper surface of the plate-like portion 835a, at which the axially upper surface of the plate-like portion 835a is indented axially downwardly. A second boundary 851 may be arranged in the second seal portion 839 or may be arranged in the concave portion 70. With this configuration, outflow of the lubricating oil of the bearing device may be restricted. By providing another concave portion 71 radially outside of the concave portion 70, the outflow of the lubricating oil of the bearing device is even more reliably restricted.

As illustrated in FIG. 17B, the oil-repellent layer 860 may be arranged on the plate-like portion 835a to restrict the outflow of the lubricating oil.

As illustrated in FIG. 17C, an annular concave portion 881 may be arranged at a portion axially above the second seal portion 839 of the outer circumferential surface of the shaft 831, and the oil-repellent layer may be arranged in the annular concave portion 881. A second boundary 862 may be arranged in the second seal portion 839 or may be arranged in the concave portion 70. The configuration restricts the axial flow of the lubricating oil along the outer circumferential surface of the shaft 839, preventing the outflow of the lubricating oil.

Figure 18:
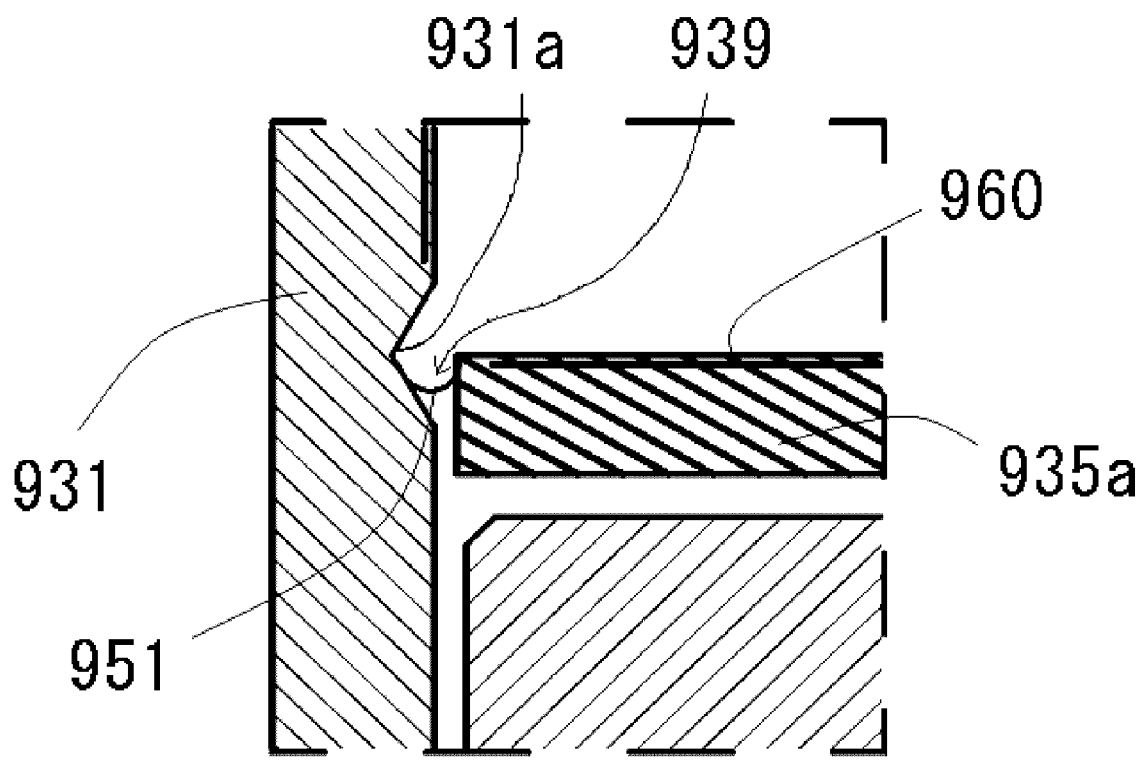
FIG. 18 is a cross sectional view illustrating a portion of the bearing device near a second boundary in a magnified manner according to yet another variant of the first preferred embodiment of the present invention.

With reference to FIG. 18, another variant of the preferred embodiments of the present invention will be described in detail. Note that in FIG. 18, elements similar to those illustrated in the foregoing description are denoted by similar or the same reference numerals, and description thereof is omitted.

As illustrated in FIG. 18, a second seal portion 939 is defined between an inner circumferential surface of the plate-like portion 935a and a portion of an outer circumferential surface of the shaft 931, radially opposing each other via a gap therebetween. The portion of the outer circumferential surface is slanted at portion 931a relative to the center axis such that a clearance of the gap in the radial direction gradually increases toward axially upper direction. The lubricating oil meets the outside air in the second seal portion 939, defining a second boundary 951 in the second seal portion 939. Additionally, the inner circumferential surface may be slanted such that the clearance of the gap in the radial direction gradually increases toward an axially upper direction. An oil-repellent layer 960 may be arranged on the plate-like portion 935a to restrict the outflow of the lubricating oil.

While various preferred embodiments of the present invention have been described in the foregoing, the present invention is not limited to the preferred embodiments detailed above, and various modifications are possible. To those skilled in the art, it will be apparent from the foregoing disclosure that various changes and modifications can be made herein without departing from the scope of the present invention. The scope of the present invention, therefore, is to be determined solely by the following claims.

What is claimed is:

1. A fluid dynamic pressure bearing comprising:
    a shaft centered on a center axis;
    a stationary portion having a bearing hole into which the shaft is inserted and being arranged to support the shaft in a rotatable manner about the center axis;
    a radial gap located between opposing surfaces of the shaft and the stationary portion;
    a lubricating oil arranged to fill the radial gap;
    a first seal portion, at least partially in the form of an axially extending space, arranged within the stationary portion outside the radial gap in a radial direction that is substantially perpendicular to the center axis and connected to the radial gap;
    a second seal portion, at least partially in the form of an axially extending space, arranged at an upper end of the radial gap and connected to the radial gap and the first seal portion; and
    a radial fluid dynamic pressure bearing located in a first gap as a portion of the radial gap and having a plurality of dynamic pressure generation grooves arranged to generate a dynamic pressure of the lubricating oil during rotation of the shaft; wherein
    an axial length of the first seal portion is longer than that of the second seal portion.

2. A fluid dynamic pressure bearing according to claim 1, wherein a first boundary between the lubricating oil and air is located in the first seal portion, and a second boundary between the lubricating oil and air is located in the second seal portion axially above the first boundary.

3. A fluid dynamic pressure bearing according to claim 1, wherein the stationary portion has a first path with which the lubricating oil is filled, the first path being arranged to connect the first seal portion, an upper end of the first gap, and the second seal portion to one another.

4. A fluid dynamic pressure bearing according to claim 1, wherein the stationary portion has a second path with which the lubricating oil is filled, the second path being arranged to connect the first seal portion and a lower end of the first gap to each other.

5. A fluid dynamic pressure bearing according to claim 1, wherein the axially extending space of the first seal portion is tapered along the center axis.

6. A fluid dynamic pressure bearing according to claim 5, wherein the axially extending space of the second seal portion is tapered to become wider as it moves upward, and a taper angle of the second seal portion is larger than a taper angle of the first seal portion.

7. A fluid dynamic pressure bearing according to claim 1, wherein a boundary between the lubricating oil and air is located in the second seal portion, and an upper end of an inner circumferential surface of the stationary portion radially opposed to an outer surface of the shaft defining an open end of the second seal portion has a step adjacent to the boundary.

8. A fluid dynamic pressure bearing according to claim 1, wherein a first boundary between the lubricating oil and air is located in the first seal portion, and a second boundary between the lubricating oil and air is located in the second seal portion, a radial width of the first boundary is larger than that of the second boundary.

9. A fluid dynamic pressure bearing according to claim 1, wherein a boundary between the lubricating oil and air is located in the second seal portion, and an oil-repellent layer is located on a portion of at least one of the opposing surfaces of the shaft and the stationary portion, which is located above the boundary.

10. A fluid dynamic pressure bearing according to claim 1, wherein a first boundary between the lubricating oil and air is located in the first seal portion, a second boundary between the lubricating oil and air is located in the second seal portion, and no boundary between the lubricating oil and the air, other than the first and second boundaries, is provided.

11. A spindle motor comprising:
the fluid dynamic pressure bearing according to claim 1;
a rotor including a shaft and a rotor magnet; and
a stator attached to the stationary portion.

12. A fluid dynamic pressure bearing comprising:
a shaft centered on a center axis;
a stationary portion having a bearing hole into which the shaft is inserted and being arranged to support the shaft in a rotatable manner about the center axis;
a radial gap located between opposing surfaces of the shaft and the stationary portion;
a lubricating oil arranged to fill the radial gap;
a first seal portion, at least partially in the form of an axially extending space, arranged within the stationary portion outside the radial gap in a radial direction that is substantially perpendicular to the center axis and connected to the radial gap;
a second seal portion, at least partially in the form of an axially extending space, arranged at an upper end of the radial gap and connected to the radial gap and the first seal portion; and
a radial fluid dynamic pressure bearing located in a first gap as a portion of the radial gap and having a plurality of dynamic pressure generation grooves arranged to generate a dynamic pressure of the lubricating oil during rotation of the shaft; wherein
a first boundary between the lubricating oil and air is located in the first seal portion, and a second boundary between the lubricating oil and air is located in the second seal portion axially above the first boundary.

13. A fluid dynamic pressure bearing according to claim 12, wherein an axial length of the first seal portion is longer than that of the second seal portion.

14. A fluid dynamic pressure bearing according to claim 12, wherein the stationary portion has a first path through which the lubricating oil is filled, the first path connecting the first seal portion, an upper end of the first gap, and the second seal portion to one another.

15. A fluid dynamic pressure bearing according to claim 12, wherein the stationary portion has a second path with which the lubricating oil is filled in the radial gap, the second path connecting the first seal portion and a lower end of the first gap to each other.

16. A fluid dynamic pressure bearing according to claim 12, wherein the axially extending space of the first seal portion is tapered along the center axis.

17. A fluid dynamic pressure bearing according to claim 16, wherein the axially extending space of the second seal portion is tapered to become wider as it moves upward, and a taper angle of the second seal portion is larger than a taper angle of the first seal portion.

18. A fluid dynamic pressure bearing according to claim 12, wherein a boundary between the lubricating oil and air is located in the second seal portion, and an upper end of an inner circumferential surface of the stationary portion radially opposed to an outer surface of the shaft defining an opening end of the second seal portion has a step adjacent to the boundary.

19. A fluid dynamic pressure bearing according to claim 12, wherein a first boundary between the lubricating oil and air is located in the first seal portion, and a second boundary between the lubricating oil and air is located in the second seal portion, a radial width of the first boundary is larger than that of the second boundary.

20. A fluid dynamic pressure bearing according to claim 12, wherein a boundary between the lubricating oil and air is located in the second seal portion, and an oil-repellent layer is located on a portion of at least one of the opposing surfaces of the shaft and the stationary portion, which is located above the boundary.

21. A fluid dynamic pressure bearing according to claim 12, wherein a first boundary between the lubricating oil and air is located in the first seal portion, a second boundary between the lubricating oil and air is located in the second seal portion, and no boundary between the lubricating oil and the air, other than the first and second boundaries, is provided.

22. A spindle motor comprising:
the fluid dynamic pressure bearing according to claim 12;
a rotor including a shaft and a rotor magnet; and
a stator attached to the stationary portion.

* * * * *